(12) United States Patent
Shindo et al.

(10) Patent No.: US 11,789,346 B2
(45) Date of Patent: Oct. 17, 2023

(54) LIGHT SOURCE DEVICE AND PROJECTOR

(71) Applicant: SEIKO EPSON CORPORATION, Tokyo (JP)

(72) Inventors: Naoya Shindo, Azumino (JP); Shin Aruga, Azumino (JP); Makoto Zakoji, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/699,445

(22) Filed: Mar. 21, 2022

(65) Prior Publication Data

US 2022/0299850 A1 Sep. 22, 2022

(30) Foreign Application Priority Data

Mar. 22, 2021 (JP) .................. 2021-047781

(51) Int. Cl.
*G03B 21/16* (2006.01)
*G03B 21/20* (2006.01)

(52) U.S. Cl.
CPC ............. *G03B 21/16* (2013.01); *G03B 21/20* (2013.01)

(58) Field of Classification Search
CPC .... G03B 21/006; G03B 21/008; G03B 21/16; G03B 21/20; G03B 21/28; G03B 21/145; H04N 9/31; H04N 9/315; H04N 9/3105; H04N 9/3141; H04N 9/3144; H04N 9/3185

See application file for complete search history.

(56) References Cited

U.S. PATENT DOCUMENTS

| | | | |
|---|---|---|---|
| 9,341,930 B2 | 5/2016 | Zakoji et al. | |
| 9,817,303 B2* | 11/2017 | Takagi | H04N 9/3144 |
| 9,983,466 B2* | 5/2018 | Fukuda | F21V 29/60 |
| 10,234,752 B1* | 3/2019 | Chien | F21V 29/763 |
| 10,845,685 B2 | 11/2020 | Aruga et al. | |
| 2012/0069586 A1* | 3/2012 | Miyazaki | F21V 29/763 362/382 |
| 2012/0249981 A1* | 10/2012 | Hirosawa | G03B 21/2086 353/100 |
| 2013/0038841 A1 | 2/2013 | Zakoji et al. | |
| 2019/0196311 A1* | 6/2019 | Sugiyama | F28D 15/0283 |
| 2019/0227415 A1 | 7/2019 | Aruga et al. | |
| 2020/0224826 A1* | 7/2020 | Tian | G03B 21/2033 |

FOREIGN PATENT DOCUMENTS

| | | |
|---|---|---|
| JP | 2016-33670 A | 3/2016 |
| JP | 2019-128465 A | 8/2019 |

\* cited by examiner

*Primary Examiner* — Sultan Chowdhury
(74) *Attorney, Agent, or Firm* — Oliff PLC

(57) ABSTRACT

A light source device includes a light emitting element configured to emit light, a substrate on which the light emitting element is disposed, a first heat radiating member thermally connected to the substrate, a base supporting the first heat radiating member, a frame fixed to the base and surrounding the light emitting element and the substrate, and a pressing member fixed to the frame and configured to press the substrate toward the first heat radiating member.

12 Claims, 11 Drawing Sheets

FIG. 7
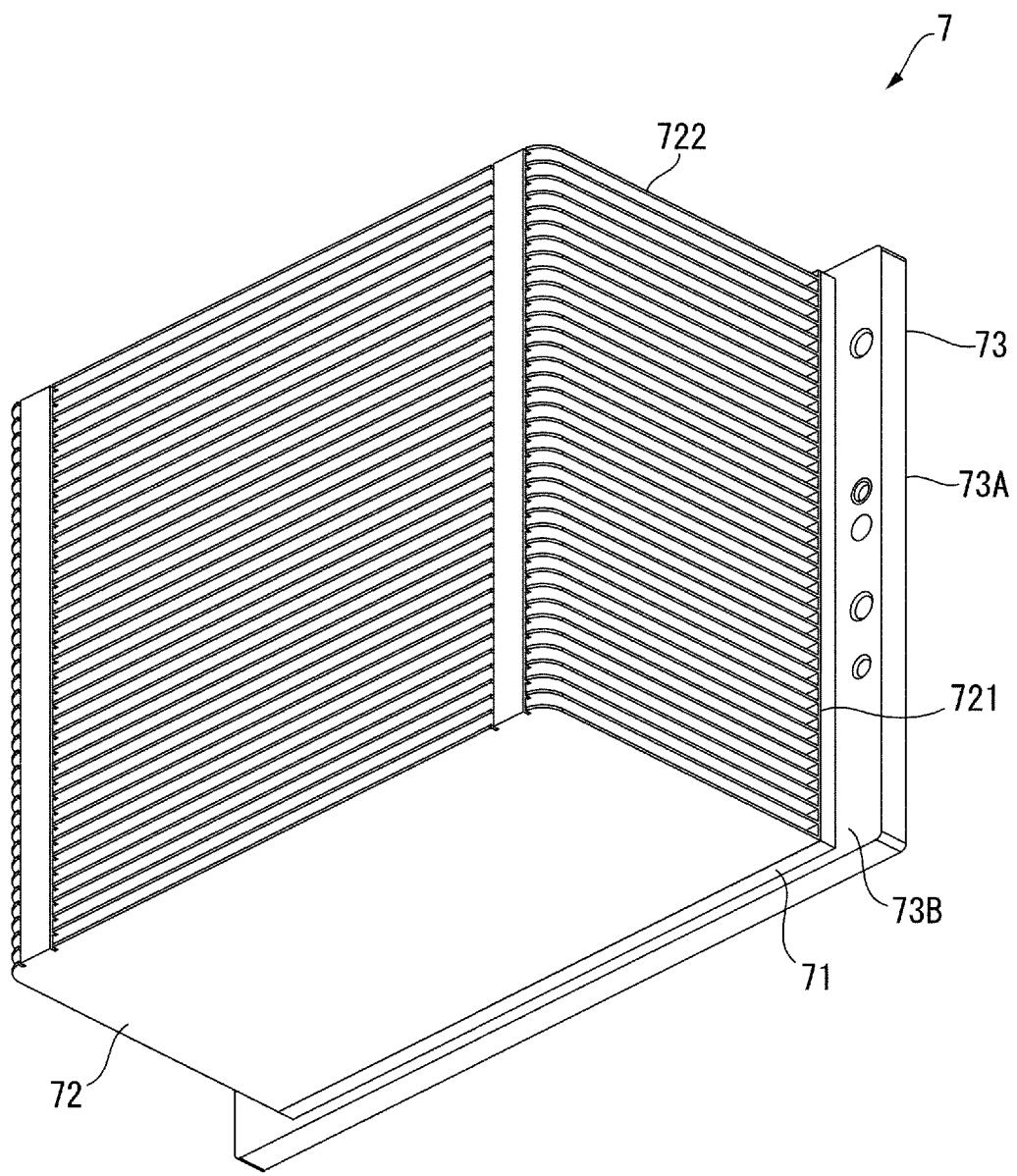
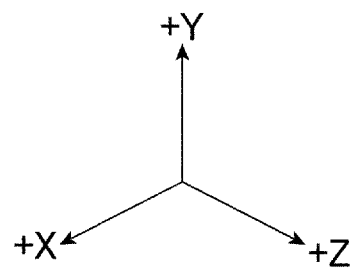

LIGHT SOURCE DEVICE AND PROJECTOR

The present application is based on, and claims priority from JP Application Serial Number 2021-047781, filed Mar. 22, 2021, the disclosure of which is hereby incorporated by reference herein in its entirety.

BACKGROUND

1. Technical Field

The present disclosure relates to a light source device and a projector.

2. Related Art

There has been known a projector including a light source device, a light modulation device that modulates light emitted from the light source device, and a projection optical device that projects the light modulated by the light modulation device (see, for example, JP-A-2019-128465 (Patent Literature 1)).

The light source device included in the projector described in Patent Literature 1 includes a light source unit and a cooling mechanism. The light source unit includes a plurality of light emitting elements and a base member holding the plurality of light emitting elements. The cooling mechanism includes a heat receiving plate, a heat diffusing member, a heat radiation fin, and a cooling fan. The base member is fixed to the heat receiving plate by screws. The heat receiving plate includes an opening covered by the base member. The heat diffusing member is a vapor chamber and includes a projecting portion having a size insertable into the opening of the heat receiving plate and a main body portion fixed to a second surface on the opposite side of a first surface to which the base member is fixed in the heat receiving plate. The heat radiation fin includes a plurality of heat radiation plates fixed to a container of the heat diffusing member and a plurality of fins raising from the heat radiation plates. Between the fins adjacent to each other, an air current generated by the cooling fan circulates toward the heat radiation plate.

In the light source device described in Patent Literature 1, the base member holding the plurality of light emitting elements is fixed to the heat receiving plate by the screws and is in surface contact with the heat diffusing member in the opening of the heat receiving plate. Therefore, a portion fixed to the heat receiving plate by the screws in the base member cannot come into contact with the heat diffusing member. Accordingly, it is likely that the heat of the plurality of light emitting elements cannot be efficiently transmitted from the base member to the heat diffusing member.

SUMMARY

A light source device according to a first aspect of the present disclosure includes: a light emitting element configured to emit light; a substrate on which the light emitting element is disposed; a first heat radiating member thermally connected to the substrate; a base supporting the first heat radiating member; a frame fixed to the base and surrounding the light emitting element and the substrate; and a pressing member fixed to the frame and configured to press the substrate toward the first heat radiating member.

A projector according to a second aspect of the present disclosure includes: the light source device according to the first aspect; a light modulator configured to modulate light emitted from the light source device; and a projection optical device configured to project the light modulated by the light modulation device.

BRIEF DESCRIPTION OF THE DRAWINGS

FIG. 7 is a perspective view showing the light source device in the first embodiment.

DESCRIPTION OF EXEMPLARY EMBODIMENTS

First Embodiment

A first embodiment of the present disclosure is explained below with reference to the drawings.

Schematic Configuration of a Projector

Figure 1:
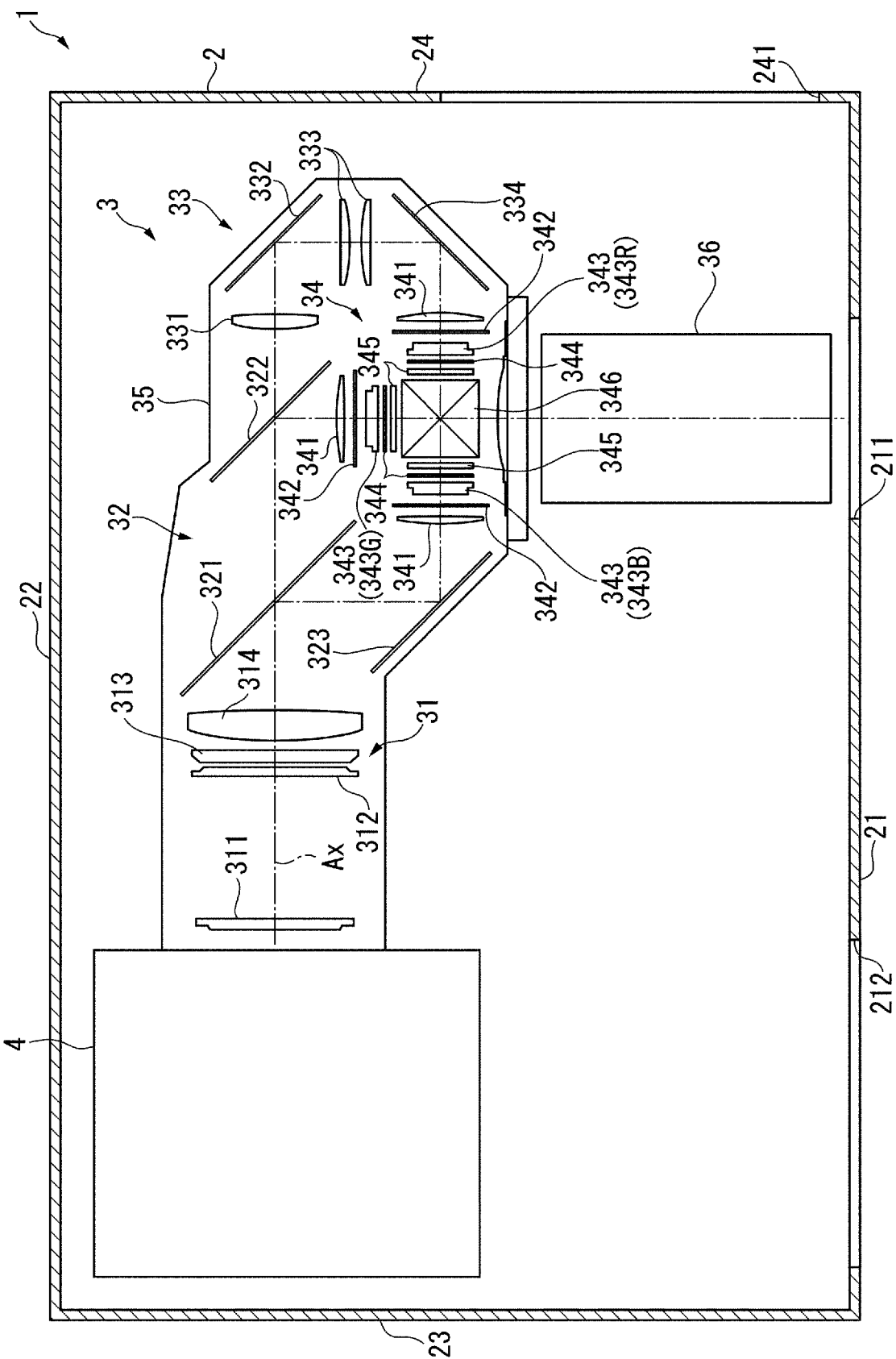
FIG. 1 is a schematic diagram showing the configuration of a projector in a first embodiment.

FIG. 1 is a schematic diagram showing the configuration of a projector 1 according to this embodiment.

The projector 1 according to this embodiment modulates light emitted from a light source device 5 (see FIGS. 3 and 4) to form an image corresponding to image information and enlarges and projects the formed image onto a projection surface such as a screen. The projector 1 includes, as shown in FIG. 1, an exterior housing 2 and an image projection device 3. Besides, although not shown in FIG. 1, the projector 1 includes a power supply device that supplies electric power to electronic components configuring the projector 1, a control device that controls the operation of the projector 1, and a cooling device that cools cooling targets configuring the projector 1. The cooling device includes a fan that circulates a cooling gas to a second heat radiating member 72 explained below.

Configuration of the Exterior Housing

The exterior housing 2 configures the exterior of the projector 1 and houses the image projection device 3, the power supply device, the control device, and the cooling device on the inside.

The exterior housing 2 includes a front surface 21, a back surface 22, a left side surface 23, and a right side surface 24. Although not shown in FIG. 1, the exterior housing 2 includes a top surface connecting one end portions in the surfaces 21 to 24 and a bottom surface connecting the other end portions in the surfaces 21 to 24. The exterior housing 2 is formed in, for example, a substantially rectangular parallelepiped shape.

The right side surface 24 includes an air intake port 241. The air intake port 241 introduces air on the outside of the exterior housing 2 into the inside of the exterior housing 2. A filter that collects dust included in the air passing through the air intake port 241 may be provided in the air intake port 241.

The front surface 21 includes a passage port 211 located substantially in the center in the front surface 21. Light projected from a projection optical device 36 explained below passes through the passage port 211.

The front surface 21 includes an exhaust port 212 located on the left side surface 23 side in the front surface 21. The exhaust port 212 discharges the air having cooled cooling targets provided in the exterior housing 2 to the outside of the exterior housing 2.

Configuration of the Image Projection Device

The image projection device 3 forms an image corresponding to image information input from the control device and projects the formed image. The image projection device 3 includes an illumination device 4, a uniformizing system 31, a color separating system 32, a relay system 33, an image forming system 34, an optical component housing 35, and a projection optical device 36.

The configuration of the illumination device 4 is explained in detail below.

The uniformizing system 31 uniformizes light emitted from the illumination device 4. The uniformized light passes through the color separating system 32 and the relay system 33 and illuminates a modulation region of a light modulation device 343 explained below. The uniformizing system 31 includes two lens arrays 311 and 312, a polarization conversion element 313, and a superimposition lens 314.

The color separating system 32 separates light made incident from the uniformizing system 31 into color lights of red, green, and blue. The color separating system 32 includes two dichroic mirrors 321 and 322 and a reflection mirror 323 that reflects the blue light separated by the dichroic mirror 321.

The relay system 33 is provided in an optical path of the red light longer than optical paths of the other color lights and suppresses a loss of the red light. The relay system 33 includes an incident side lens 331, relay lenses 333, and reflection mirrors 332 and 334. In this embodiment, the relay system 33 is provided on the optical path of the red light. However, not only this, but, for example, color light having an optical path longer than the optical paths of the other color lights may be the blue light and the relay system 33 may be provided on the optical path of the blue light.

The image forming system 34 modulates the color lights of red, green, and blue made incident on the image forming system 34, combines the modulated color lights, and forms an image. The image forming system 34 includes three field lenses 341, three incident side polarizing plates 342, three light modulation devices 343, three viewing angle compensator 344, and three emission side polarizing plates 345 provided according to the incident color lights and one color combining member 346.

The light modulation device 343 modulates, according to image information, light emitted from the illumination device 4. Specifically, the light modulation device 343 modulates light emitted from the light source device 5 configuring the illumination device 4. The three light modulation devices 343 include a light modulation device 343R that modulates the red light, a light modulation device 343G that modulates the green light, and a light modulation device 343B that modulates the blue light. The light modulation device 343 is configured by a transmissive liquid crystal panel. A liquid crystal light valve is configured by the incident side polarizing plate 342, the light modulation device 343, and the emission side polarizing plate 345.

The color combining member 346 combines the three color lights modulated by the light modulation devices 343B, 343G, and 343R to form an image and emits the formed image to the projection optical device 36. In this embodiment, the color combining member 346 is configured by a cross dichroic prism. However, not only this, but the color combining member 346 can also be configured by a plurality of dichroic mirrors, for example.

The optical component housing 35 houses the systems 31 to 34 on the inside. In the image projection device 3, an illumination optical axis Ax, which is an optical axis in design, is set. The optical component housing 35 holds the systems 31 to 34 in predetermined positions on the illumination optical axis Ax. The illumination device 4 and the projection optical device 36 are disposed in predetermined positions on the illumination optical axis Ax.

The projection optical device 36 is a projection lens that enlarges and projects an image made incident from the image forming system 34 onto the projection surface. That is, the projection optical device 36 projects light modulated by the light modulation device 343. As the projection optical device 36, a group lens including a plurality of lenses and a tubular lens barrel in which the plurality of lenses are housed can be illustrated.

Configuration of the Illumination Device

Figure 2:
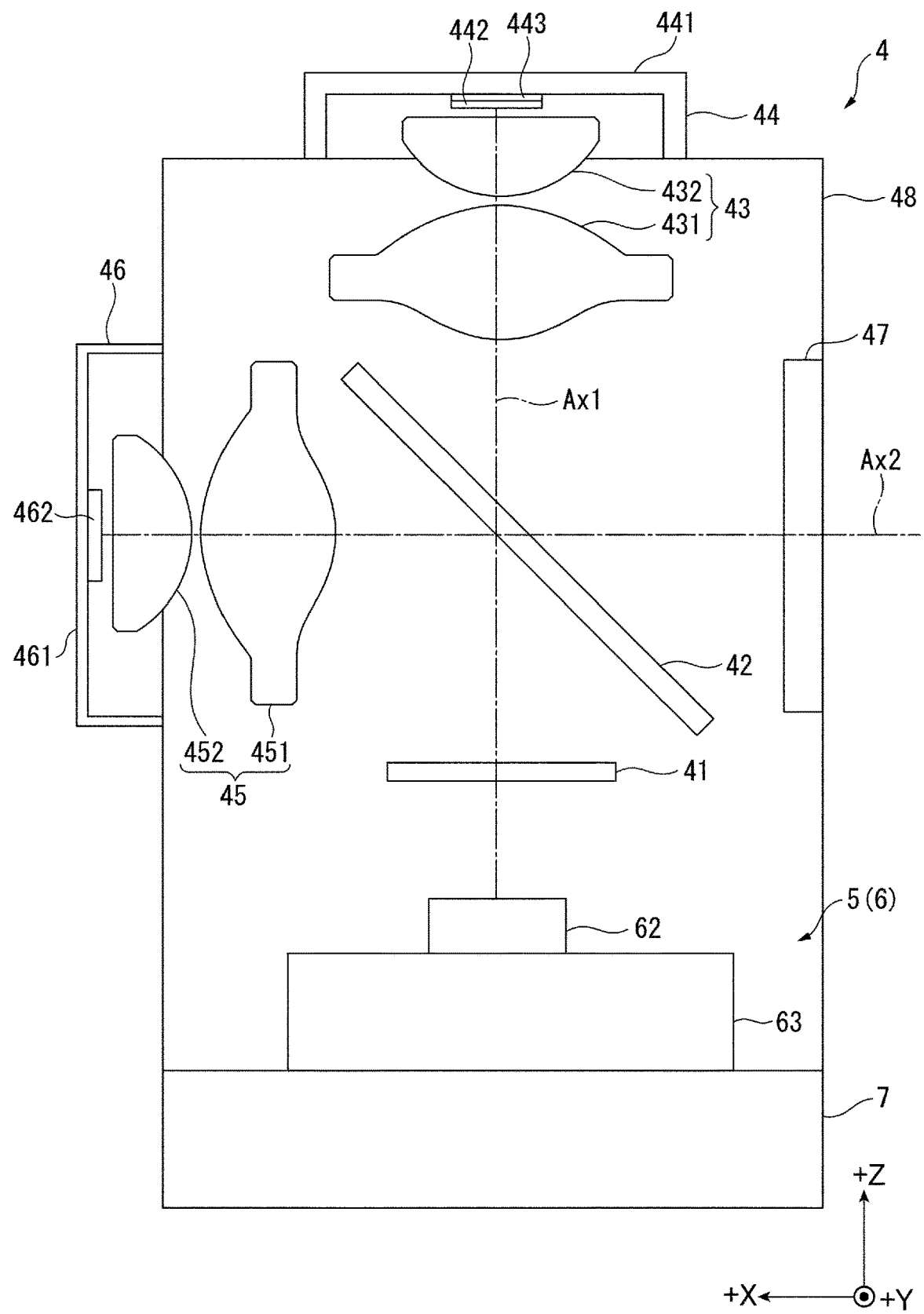
FIG. 2 is a schematic diagram showing the configuration of an illumination device in the first embodiment.

FIG. 2 is a schematic diagram showing the configuration of the illumination device 4.

The illumination device 4 emits illumination light for illuminating the light modulation device 343 to the uniformizing system 31. The illumination device 4 includes, as shown in FIG. 2, the light source device 5, a diffuser 41, a light separating system 42, a first condensing element 43, a wavelength conversion element 44, a second condensing element 45, a diffusing and reflecting element 46, a phase difference member 47, and a housing 48.

In the following explanation, three directions orthogonal to one another are represented as a +X direction, a +Y direction, and a +Z direction. The +Z direction is a direction in which the light source device 5 emits light. Although not shown in FIG. 2, the opposite direction of the +X direction is represented as a −X direction, the opposite direction of the +Y direction is represented as a −Y direction, and the opposite direction of the +Z direction is represented as a −Z direction. The −X direction is along a direction in which the illumination device 4 emits illumination light to the uniformizing system 31.

In the illumination device 4, an illumination optical axis Ax1 extending along the +Z direction and an illumination optical axis Ax2 extending along the +X direction are set. The optical components of the illumination device 4 are disposed on the illumination optical axis Ax1 or the illumination optical axis Ax2.

Specifically, the light source device 5, the diffuser 41, the light separating system 42, the first condensing element 43, and the wavelength conversion element 44 are disposed on the illumination optical axis Ax1.

The light separating system 42, the second condensing element 45, the diffusing and reflecting element 46, and the phase difference member 47 are disposed on the illumination optical axis Ax2 orthogonal to the illumination optical axis Ax1. That is, the light separating system 42 is disposed in an intersection of the illumination optical axis Ax1 and the illumination optical axis Ax2.

The illumination optical axis Ax2 coincides with the illumination optical axis Ax in the position of the lens array 311. In other words, the illumination optical axis Ax2 is set on an extended line of the illumination optical axis Ax.

A detailed configuration of the light source device 5 is explained in detail below.

Configuration of the Diffuser

The diffuser 41 diffuses light made incident from the light source device 5 and uniformizes an illuminance distribution of light emitted from the diffuser 41. As the diffuser 41, a configuration including a hologram, a configuration in which a plurality of small lenses are arrayed on an optical axis orthogonal surface, and a configuration in which a light passing surface is a rough surface can be illustrated.

Instead of the diffuser 41, a homogenizer optical element including a pair of multi-lens arrays may be adopted in the illumination device 4. On the other hand, when the diffuser 41 is adopted, compared with when the homogenizer optical element is adopted, it is possible to reduce the distance from the light source device 5 to the light separating system 42.

Configuration of the Light Separating System

Light emitted from the diffuser 41 is made incident on the light separating system 42.

The light separating system 42 has a function of a half mirror for allowing a part of light made incident from the light source device 5 via the diffuser 41 to pass and reflecting the other part of the light. The light separating system 42 has a function of a dichroic mirror for allowing blue light made incident from the diffusing and reflecting element to pass and reflecting light made incident from the wavelength conversion element 44 and having a wavelength longer than the wavelength of the blue light.

Specifically, the light separating system 42 allows first partial light, which is a part of the blue light made incident from the diffuser 41, to pass and makes the first partial light incident on the first condensing element 43 and reflects second partial light, which is the other part of the blue light, and makes the second partial light incident on the second condensing element 45.

In this embodiment, considering absorption of light in the wavelength conversion element 44, the light separating system 42 sets a light amount of the first partial light larger than a light amount of the second partial light. However, not only this, but the light amount of the first partial light may be the same as the light amount of the second partial light or may be smaller than the light amount of the second partial light.

Configuration of the First Condensing Element

The first condensing element 43 condenses, in the wavelength conversion element 44, the first partial light having passed through the light separating system 42. The first condensing element 43 collimates light made incident from the wavelength conversion element 44.

In this embodiment, the first condensing element 43 includes two lenses 431 and 432. However, the number of lenses configuring the first condensing element 43 is not limited to two.

Configuration of the Wavelength Conversion Element

The wavelength conversion element 44 is an optical element that emits light. The wavelength conversion element diffuses and emits light obtained by converting the wavelength of incident light in the opposite direction of an incident direction of the incident light. Specifically, the wavelength conversion element 44 is excited by incidence of blue light and diffuses and emits fluorescent light having a wavelength longer than the wavelength of the incident blue light toward the first condensing element 43. That is, the wavelength conversion element 44 converts light having a first wavelength band emitted from the light source device 5 into light having a second wavelength band different from the first wavelength band. The light emitted from the wavelength conversion element 44 is, for example, fluorescent light having a peak wavelength of 500 to 700 nm.

The wavelength conversion element 44 includes a substrate 441, a wavelength conversion layer 442, and a reflection layer 443.

The substrate 441 is a plate-like body formed of metal and supports the wavelength conversion layer 442 and the reflection layer 443. The substrate 441 is fixed to the housing 48.

The wavelength conversion layer 442 is provided in a position opposed to the first condensing element 43 in the substrate 441. The wavelength conversion layer 442 is a phosphor layer including a phosphor that diffuses and emits fluorescent light, which is nonpolarized light obtained by converting the wavelength of the blue light made incident from the first condensing element 43.

The reflection layer 443 is located on the opposite side of an incident side of the blue light with respect to the wavelength conversion layer 442 and reflects the fluorescent light made incident from the wavelength conversion layer 442 to the wavelength conversion layer 442 side.

The fluorescent light emitted from the wavelength conversion element 44 passes through the first condensing element 43 along the illumination optical axis Ax1 and, thereafter, is made incident on the light separating system 42. The fluorescent light made incident on the light separating system 42 is reflected in a direction along the illumination optical axis Ax2 by the light separating system 42 and made incident on the phase difference member 47.

Configuration of the Second Condensing Element

The second condensing element 45 condenses, in the diffusing and reflecting element 46, the second partial light reflected by the light separating system 42 and made incident. The second condensing element 45 collimates the blue light made incident from the diffusing and reflecting element 46.

In this embodiment, like the first condensing element 43, the second condensing element 45 includes two lenses 451 and 452. However, the number of lenses configuring the second condensing element 45 is not limited to two.

Configuration of the Diffusing and Reflecting Element

The diffusing and reflecting element 46 includes a substrate 461 and a diffusion and reflection layer 462 provided in a position opposed to the second condensing element 45 in the substrate 461.

The diffusion and reflection layer 462 reflects and diffuses the blue light made incident from the second condensing element 45 at the same diffusion angle as the diffusion angle of the fluorescent light emitted from the wavelength conversion element 44. That is, the diffusion and reflection layer 462 does not convert the wavelength of incident light and reflects and diffuses the incident light.

The blue light reflected on the diffusion and reflection layer 462 passes through the second condensing element 45 and, thereafter, passes through the light separating system 42 and is made incident on the phase difference member 47. That is, the light made incident on the phase difference member 47 from the light separating system 42 is white light in which the blue light and the fluorescent light are mixed.

Configuration of the Phase Difference Member

The phase difference member 47 converts the white light made incident from the light separating system 42 into light in which s-polarized light and p-polarized light are mixed.

White illumination light converted in this way is made incident on the uniformizing system 31.

The housing 48 houses a part of the light source device 5, the diffuser 41, the light separating system 42, the first condensing element 43, the wavelength conversion element 44, the second condensing element 45, the diffusing and reflecting element 46, and the phase difference member 47. In this embodiment, the housing 48 is a sealed housing into which dust less easily intrudes. However, not only this, but the housing 48 only has to be able to house the optical components explained above.

Configuration of the Light Source Device

Figure 3:
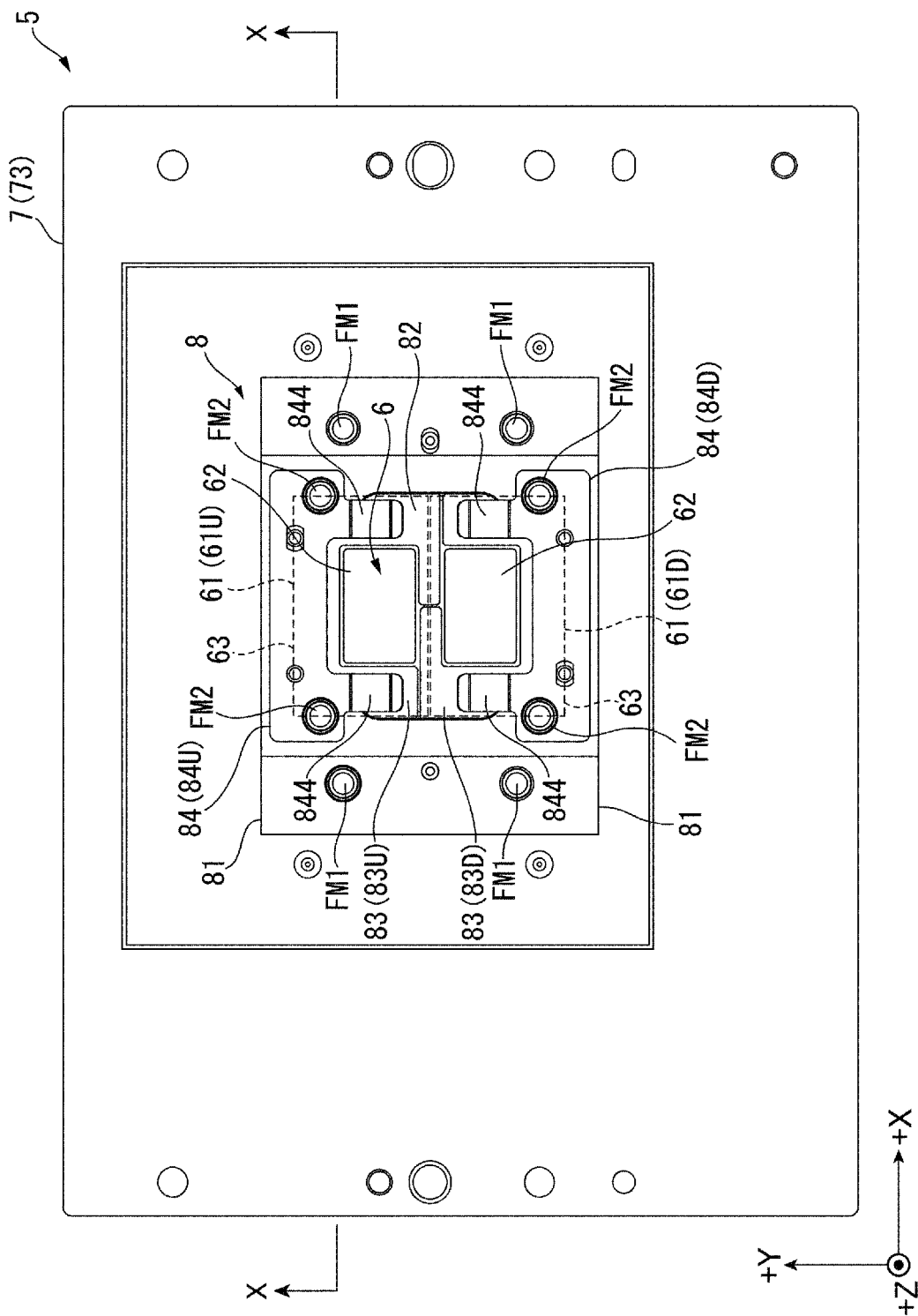
FIG. 3 is a plan view showing a light source device in the first embodiment.
Figure 4:
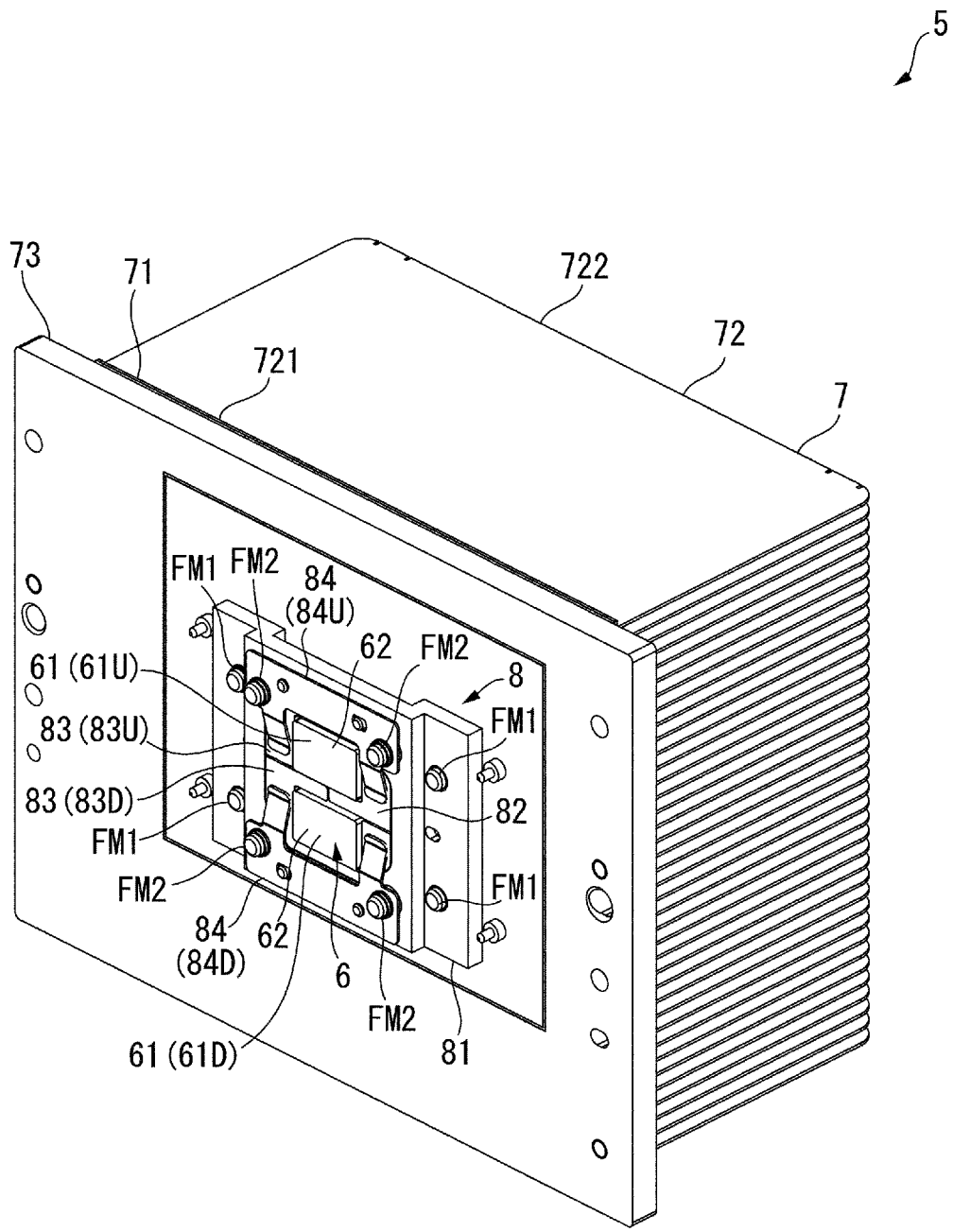
FIG. 4 is a perspective view showing the light source device in the first embodiment.
Figure 5:
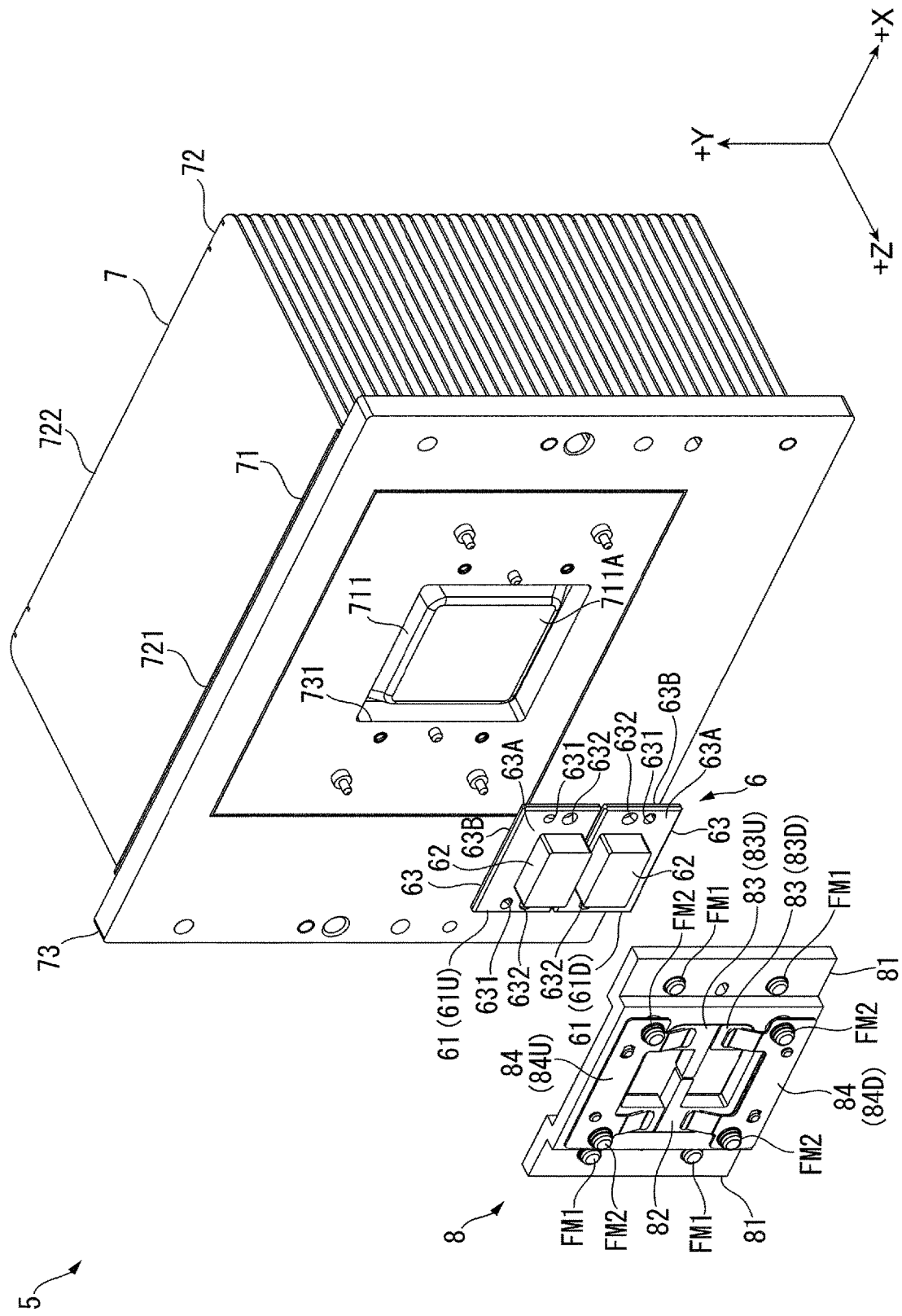
FIG. 5 is an exploded perspective view showing the light source device in the first embodiment.

FIG. 3 is a plan view showing the light source device 5 viewed from the +Z direction. FIG. 4 is a perspective view showing the light source device 5 viewed from the +Z direction. FIG. 5 is an exploded perspective view showing the light source device 5 viewed from the +Z direction.

The light source device 5 emits light. The light source device 5 includes, as shown in FIGS. 3 to 5, a light source unit 6, a cooling unit 7, and a fixing unit 8.

Configuration of the Light Source Unit

The light source unit 6 emits light in the +Z direction. The light source unit 6 includes two light emitting parts 61 as shown in FIGS. 3 to 5.

The two light emitting parts 61 are a light emitting part 61U disposed in the +Y direction and a light emitting part 61D disposed in the −Y direction. Each of the light emitting parts 61 includes, as shown in FIG. 5, light emitting elements 62, substrates 63, and a not-shown collimator lens. That is, the light source device 5 includes a plurality of light emitting elements 62 and a plurality of substrates 63.

The plurality of light emitting elements 62 emit light. In this embodiment, each of the light emitting elements 62 is configured by a plurality of semiconductor lasers that emit blue light. The light emitted from the light emitting element 62 is collimated by the collimator lens and made incident on the diffuser 41.

As shown in FIG. 2, the light source device 5 is attached to the housing 48. The plurality of light emitting elements 62 and the plurality of substrates 63 are housed on the inside of the housing 48. At least a part of the cooling unit 7 explained below is disposed on the outside of the housing 48. As explained in detail below, the cooling unit 7, to which heat is transmitted from the light emitting element 62, is cooled by a cooling gas sent from a not-shown fan. Consequently, the light emitting element 62 is cooled.

As shown in FIG. 5, each of the plurality of substrates 63 holds the light emitting element 62 corresponding thereto among the plurality of light emitting elements 62. That is, the light emitting element 62 is disposed on the substrate 63.

A surface in the +Z direction in the substrate 63 is a disposition surface 63A on which the light emitting element 62 is disposed. A pressing force for pressing the substrate 63 toward a first heat radiating member 71 explained below of the cooling unit 7 is applied to the disposition surface 63A by the fixing unit 8.

A surface in the −Z direction in the substrate 63 is a connection surface 63B to which the first heat radiating member 71 is connected to be capable of transmitting heat. That is, a heat receiving surface 711A of the first heat radiating member 71 is thermally connected to the connection surface 63B on the opposite side of the disposition surface 63A on the substrate 63.

Each of the plurality of substrates 63 includes a plurality of positioning holes 631 and a plurality of through-holes 632 piercing through the substrate 63 in the +Z direction.

The plurality of positioning holes 631 are provided in portions sandwiching a disposition region of the light emitting element 62 in the substrate 63. In this embodiment, the positioning holes 631 are provided one by one in positions sandwiching the light emitting element 62 in the +X direction. Of a positioning part 815U and a positioning part 815D (see FIG. 9) included in a frame 81 explained below of the fixing unit 8, a positioning part 815 corresponding to the positioning hole 631 is inserted into the positioning hole 631 from the +Z direction.

The plurality of through-holes 632 are provided near the positioning holes 631. In this embodiment, the through-holes 632 are provided one by one in positions sandwiching the light emitting element 62 in the +X direction. The through-holes 632 function as holes for accumulating an excess of heat conductive grease provided between the connection surface 63B and the heat receiving surface 711A of the first heat radiating member 71.

The number of light emitting elements 62 provided on one substrate 63 is not limited to one and may be two or more. That is, a plurality of light emitting elements 62 may be disposed on one substrate 63. The number of light emitting parts 61 included in the light source unit 6 is not limited to two and may be one or may be three or more. That is, the light source unit 6 only has to include at least one substrate 63.

Configuration of the Cooling Unit

Figure 6:
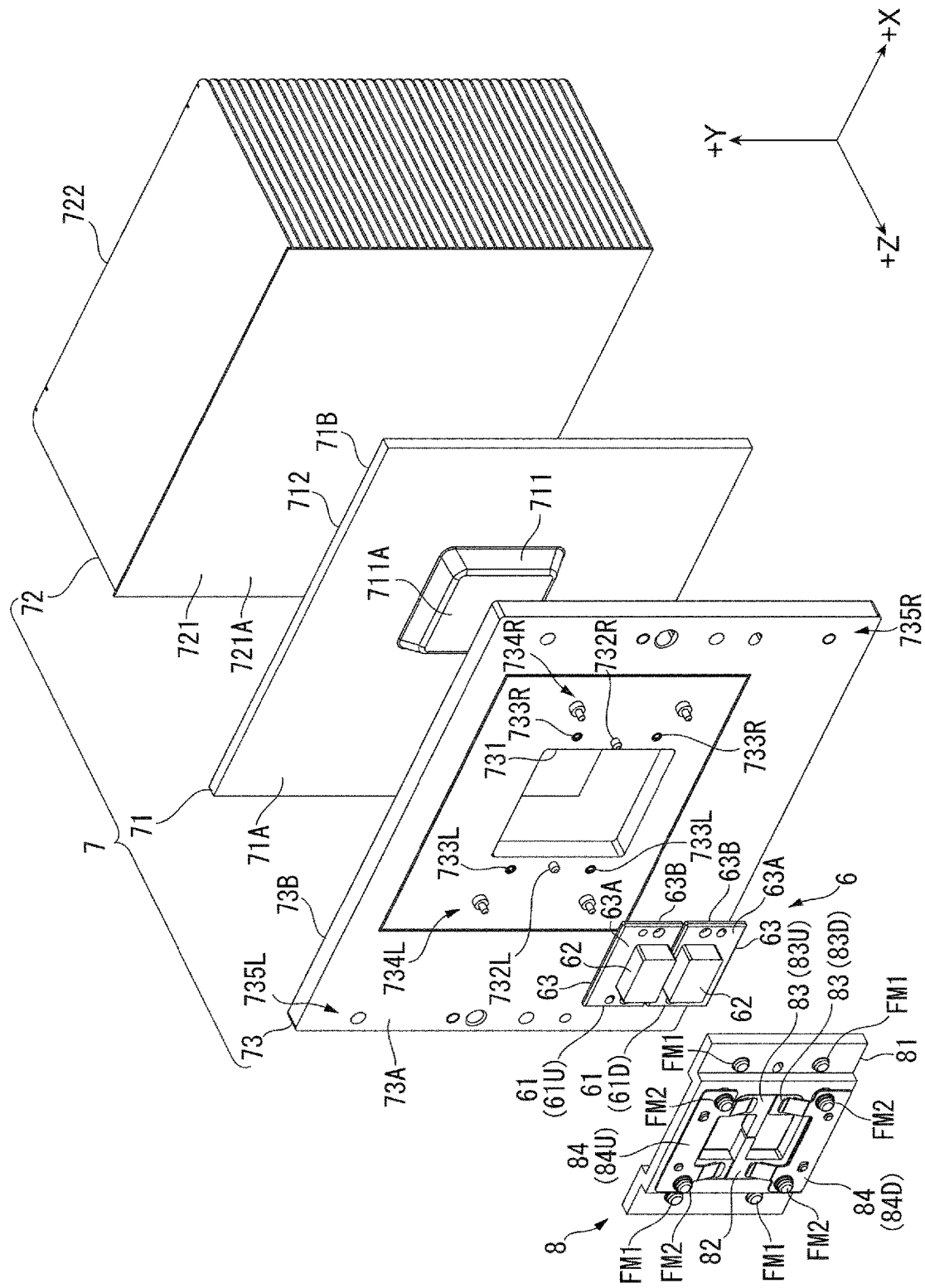
FIG. 6 is an exploded perspective view showing the light source device in the first embodiment.

FIG. 6 is an exploded perspective view showing the light source device 5 viewed from the +Z direction.

The cooling unit 7 radiates the heat of the light source unit 6 and cools the light source unit 6. Specifically, the cooling unit 7 transmits the heat of the light emitting element 62 or the like, which is transmitted from the substrate 63, to a cooling gas circulated by a not-shown fan and cools the light emitting element 62.

The cooling unit 7 includes, as shown in FIG. 6, the first heat radiating member 71, a second heat radiating member 72, and a base 73.

Configuration of the First Heat Radiating Member

The first heat radiating member 71 is thermally connected to the substrates 63. Specifically, the first heat radiating member 71 is connected to the connection surfaces 63B of the substrates 63. The first heat radiating member 71 radiates, to the second heat radiating member 72, heat transmitted from the substrates 63.

In this embodiment, the first heat radiating member 71 is a vapor chamber formed in a flat shape. The first heat radiating member 71 includes a heat receiving part 711 projecting in a substantially rectangular shape in the +Z direction from a surface 71A facing the +Z direction and a heat radiation surface 712, which is a surface on the opposite side of the surface 71A.

A surface in the +Z direction in the heat receiving part 711 is the heat receiving surface 711A thermally connected to the connection surface 63B of the substrate 63, the heat of the substrate 63 being transmitted to the heat receiving surface 711A. The area of the heat receiving surface 711A is larger than the area of a surface in the −Z direction in the light source unit 6. That is, the area of the heat receiving surface 711A is larger than an area obtained by adding up the area of the connection surface 63B of the substrate 63 included in the light emitting part 61U and the area of the connection surface 63B of the substrate 63 included in the light emitting part 61D. Therefore, the light receiving surface 711A is in surface contact with substantially the entire surfaces of the connection surfaces 63B.

The heat radiation surface 712 is thermally connected to a heat receiving surface 721A of the second heat radiating member 72.

Configuration of the Second Heat Radiating Member

FIG. 7 is a perspective view showing the light source device 5 viewed from the −Z direction.

The second heat radiating member 72 is thermally connected to the first heat radiating member 71 and radiates heat transmitted from the first heat radiating member 71. The second heat radiating member 72 is a so-called heat sink and includes, as shown in FIGS. 6 and 7, a heat receiving part 721 and a plurality of fins 722.

The heat receiving part 721 includes the heat receiving surface 721A facing the +Z direction and orthogonal to the +Z direction. The heat receiving surface 721A is in surface contact with substantially the entire surface of the heat radiation surface 712. The heat of the light emitting element 62 transmitted from the first heat radiating member 71 to the heat receiving part 721 is conducted to the plurality of fins 722.

The plurality of fins 722 extend in the −Z direction from a surface in the −Z direction in the heat receiving part 721. The cooling gas is circulated to gaps among the plurality of fins 722 by a not-shown fan. The plurality of fins 722 transmit the heat transmitted from the first heat radiating member 71, that is, the heat of the light emitting element 62 to the cooling gas to thereby radiate the heat of the light emitting element 62. Consequently, the light source unit 6 is cooled.

Configuration of the Base

The base 73 supports the first heat radiating member 71 and the second heat radiating member 72 and is formed in a substantially rectangular frame shape. That is, the first heat radiating member 71 and the second heat radiating member 72 are attached to the base 73. The base 73 includes, as shown in FIG. 6, an opening 731, positioning parts 732L and 732R, fixing parts 733L and 733R, first attaching parts 734L and 734R, and second attaching parts 735L and 735R.

The surface 71A of the first heat radiating member 71 is connected to a surface 73B in the −Z direction in the base 73.

The opening 731 is a substantially rectangular opening provided substantially in the center when the base 73 is viewed from the +Z direction. The opening 731 pierces through the base 73 in the +Z direction. The heat receiving part 711 of the first heat radiating member 71 is disposed in the opening 731 from the −Z direction. That is, the base 73 surrounds the heat receiving part 711 when viewed from the +Z direction. The opening 731 is covered by the fixing unit 8 disposed on the base 73 from the +Z direction.

The positioning part 732R is disposed in the +X direction with respect to the opening 731. The positioning part 732L is disposed in the −X direction with respect to the opening 731. That is, the positioning parts 732L and 732R sandwich the opening 731 in the +X direction. The positioning parts 732L and 732R are positioning pins projecting in the +Z direction from a surface 73A in the +Z direction in the base 73. The positioning parts 732L and 732R are inserted into the frame 81 explained below of the fixing unit 8 and positions the frame 81.

The fixing parts 733R are disposed in positions sandwiching the positioning part 732R in the +Y direction. The fixing parts 733L are disposed in positions sandwiching the positioning part 732L in the +Y direction. That is, two fixing parts 733R are provided in the +X direction with respect to the opening 731. Two fixing parts 733L are provided in the −X direction with respect to the opening 731. The fixing parts 733L and 733R are holes to which fixing members FM1 such as screws inserted through the frame 81 are fixed. The fixing members FM1 are fixed to the fixing parts 733L and 733R, whereby the frame 81 is fixed to the surface 73A.

The first attaching parts 734L and 734R are portions to which other optical components are attached. The first attaching part 734R is disposed in the +X direction with respect to the fixing parts 733R. The first attaching part 734L is disposed in the −X direction with respect to the fixing parts 733L.

The second attaching parts 735L and 735R are portions for attaching the base 73 to the housing 48. The second attaching part 735R is disposed at the end portion in the +X direction in the base 73. The second attaching part 735L is disposed at the end portion in the −X direction in the base 73.

Configuration of the Fixing Unit

The fixing unit 8 is attached to the base 73 and presses and fixes the light source unit 6 to the first heat radiating member 71. The fixing unit 8 includes, as shown in FIGS. 3 to 6, the frame 81, a spacer 82, and a plurality of pressing members 84 (84U and 84D).

Configuration of the Frame

The frame 81 is fixed to the base 73 as shown in FIGS. 3 and 4. The frame 81 is a rectangular frame body when viewed from the +Z direction. As shown in FIG. 3, the frame 81 surrounds the light emitting parts 61U and 61D when viewed from the +Z direction. That is, the frame 81 surrounds the plurality of light emitting elements 62 and the plurality of substrates 63.

The frame 81 has a function of fixing the light source unit 6 and a function of supporting the pressing member 84. The frame 81 is formed of a metal material having a light blocking property and thermal conductivity. That is, the frame 81 has a light blocking property and heat radiation property. The frame 81 blocks return light traveling from an optical component such as the diffuser 41 toward the light source unit 6 and suppresses the return light from being made incident on the light source unit 6, in particular, the substrate 63. The frame 81 radiates heat transmitted from the substrate 63.

Figure 8:
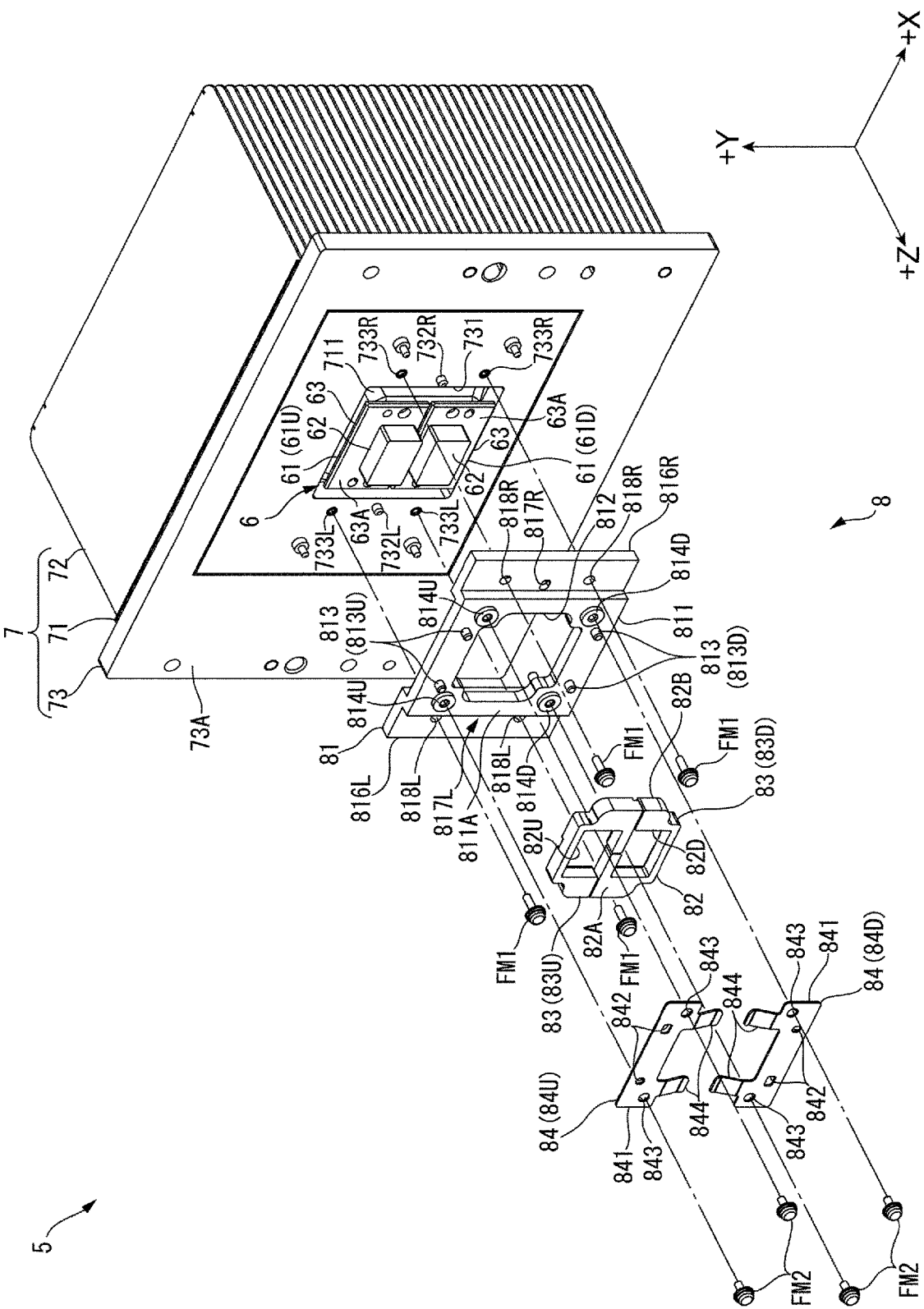
FIG. 8 is an exploded perspective view showing a fixing unit in the first embodiment.

FIG. 8 is an exploded perspective view showing the fixing unit 8 viewed from the +Z direction.

The frame 81 includes, as shown in FIG. 8, a main body 811 and step parts 816L and 816R.

The main body 811 is formed in a substantially rectangular frame shape when viewed from the +Z direction. The main body 811 includes an opening 812, positioning parts 813U and 813D, and fixing parts 814U and 814D.

The opening 812 is provided in a substantially rectangular shape in the center of the main body 811 when viewed from the +Z direction. When the frame 81 is fixed to the base 73, the light emitting elements 62 and the spacer 82 are disposed in the opening 812. Four corners of the opening 812 project toward the inner side of the opening 812 when viewed from the +Z direction.

The positioning parts 813U and 813D are provided on a surface 811A in the +Z direction in the main body 811.

The positioning parts 813U position the pressing member 84U. Two positioning parts 813U are provided to be separated in the +X direction in positions in the +Y direction with respect to the opening 812.

The positioning parts 813D position the pressing member 84D. Two positioning parts 813D are provided to be separated in the +X direction in positions in the −Y direction with respect to the opening 812.

The plurality of fixing parts 814U and 814D are provided on the surface 811A.

The fixing parts 814U fix the pressing member 84U. The fixing parts 814U are provided in positions sandwiching the positioning parts 813U in the +X direction in positions in the +Y direction with respect to the opening 812. Fixing members FM2 inserted through the pressing member 84U are fixed to the fixing parts 814U.

The fixing parts 814D fix the pressing member 84D. The fixing parts 814D are provided in positions sandwiching the positioning parts 813D in the +X direction in positions in the −Y direction with respect to the opening 812. The fixing members FM2 inserted through the pressing member 84D are fixed to the fixing parts 814D.

Figure 9:
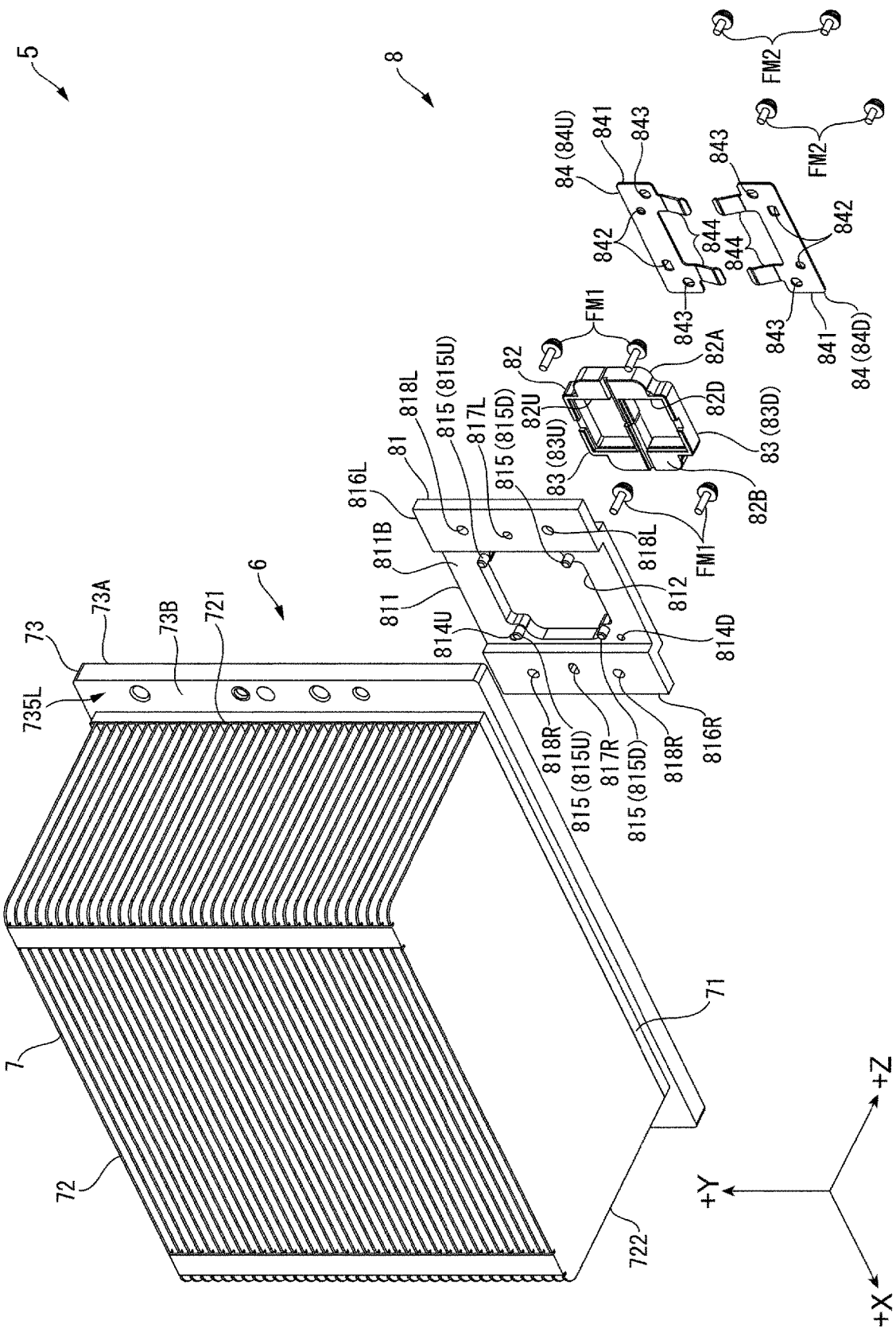
FIG. 9 is an exploded perspective view showing the fixing unit in the first embodiment.

FIG. 9 is an exploded perspective view showing the fixing unit 8 viewed from the −Z direction.

The main body 811 further includes, as shown in FIG. 9, the positioning parts 815U and 815D that position the substrate 63.

The positioning parts 815U and 815D are provided on a surface 811B in the −Z direction in the main body 811.

The positioning parts 815U are provided in positions in the +Y direction among positions corresponding to the four corners of the opening 812 on the surface 811B. That is, two positioning parts 815U are provided to be separated in the +X direction in positions in the +Y direction on the surface 811B.

The positioning parts 815D are provided in positions in the −Y direction among the positions corresponding to the four corners of the opening 812 on the surface 811B. That is, two positioning parts 815D are provided to be separated in the +X direction in positions in the −Y direction on the surface 811B.

Each of the positioning parts 815U and 815D is a positioning pin projecting in the −Z direction from the surface 811B. The two positioning parts 815U are inserted into the two positioning holes 631 (see FIG. 5) provided on the substrate 63 of the light emitting part 61U and position the substrate 63 of the light emitting part 61U. The two positioning parts 815D are inserted into the two positioning holes 631 (see FIG. 5) provided on the substrate 63 of the light emitting part 61D and position the substrate 63 of the light emitting part 61D.

As shown in FIG. 8, the step part 816R is provided in the +X direction with respect to the main body 811. The step part 816R is a portion extending in the −Z direction from the end portion in the +X direction in the main body 811 and, thereafter, extending in the +X direction. The step part 816R includes a positioning hole 817R and holes 818R.

The positioning hole 817R is provided substantially in the center in the +Y direction in the step part 816R and pierces through the step part 816R along the +Z direction. The positioning part 732R protruded on the surface 73A of the base 73 is inserted into the positioning hole 817R.

The holes 818R are provided in positions sandwiching the positioning hole 817R in the +Y direction. That is, two holes 818R are provided in the step part 816R. The fixing members FM1 for fixing the frame 81 to the base 73 are inserted through the two holes 818R and fixed to the fixing part 733R.

The step part 816L is a portion extending in the −Z direction from the end portion in the −X direction in the main body 811 and, thereafter, extending in the −X direction. Like the step part 816R, the step part 816L includes a positioning hole 817L and holes 818L.

The positioning hole 817L and the holes 818L in the step part 816L act in the same manner as the positioning hole 817R and the holes 818R in the step part 816R. Therefore, explanation about the positioning hole 817L and the holes 818L is omitted.

When the light source unit 6 is disposed to thermally connect the connection surface 63B to the first heat radiating member 71 and the frame 81 is attached to the base 73, as indicated by a dotted line in FIG. 3, the portions in the +Z direction of the substrate 63 of the light emitting part 61U and the substrate 63 of the light emitting part 61D are covered by the frame 81.

Configuration of the Spacer

The spacer 82 is disposed in the opening 812 to be in contact with the disposition surfaces 63A of the substrates 63 of the light emitting parts 61U and 61D. The spacer 82 presses the substrates 63 toward the first heat radiating member 71 with an urging force of the pressing member 84. In other words, the spacer 82 is an interposed member provided between pressing parts 844 of the pressing member 84 and the disposition surfaces 63A in the +Z direction.

The spacer 82 is formed substantially in a FIG. 8 shape when viewed from the +Z direction. The external shape of the spacer 82 is a shape along the end edge of the opening 812. Therefore, the spacer 82 is fit in the opening 812 to thereby be positioned in the opening 812.

The spacer 82 includes a substantially rectangular opening 82U provided in the +Y direction and a substantially rectangular opening 82D provided in the −Y direction.

When the spacer 82 is disposed in the opening 812, the opening 82U exposes the light emitting element 62 of the light emitting part 61U. In other words, the opening 82U is an opening for avoiding the light emitting element 62.

When the spacer 82 is disposed in the opening 812, the opening 82D exposes the light emitting element 62 of the light emitting part 61D. In other words, the opening 82D is an opening for avoiding the light emitting element 62.

In the spacer 82, a surface in the +Z direction is a contact surface 82A that comes into contact with the pressing parts 844. In the spacer 82, a surface in the −Z direction is a pressing surface 82B that comes into contact with the substrates 63 of the light emitting parts 61 and pressing the substrates 63 toward the first heat radiating member 71.

The spacer 82 is formed of a metal material having a light blocking property and thermal conductivity. That is, like the frame 81, the spacer 82 has a light blocking property and heat radiation property. The spacer 82 is disposed in the opening 812 in the +Z direction with respect to the substrate 63 to thereby block return light made incident on the substrate from the optical components such as the diffuser 41. Consequently, the return light is suppressed from being made incident on the substrate 63. The spacer 82 radiates the heat of the light emitting element 62 transmitted from the substrate 63.

In this embodiment, the spacer 82 is configured by combining a plurality of spacer elements 83. Specifically, the spacer 82 is configured by combining two spacer elements 83. One spacer element 83 of the two spacer elements 83 is a spacer element 83U disposed in the +Y direction and the other spacer element 83 is a spacer element 83D disposed in the −Y direction.

The shapes of the spacer elements 83U and 83D are the same. The spacer 82 is configured by combining the spacer element 83U and the spacer element 83D to be symmetrical centering on an axis along the +X direction.

Configuration of the Pressing Member

Each of the plurality of pressing members 84 is fixed to the frame 81 and presses the substrates 63 toward the first heat radiating member 71. In this embodiment, the pressing members 84 press the substrates 63 toward the first heat radiating member 71 via the spacer 82.

The plurality of pressing members 84 include the pressing member 84U provided in the +Y direction and the pressing member 84D provided in the −Y direction.

In this embodiment, the pressing members 84U and 84D are leaf springs made of metal. That is, the pressing members 84U and 84D are formed of metal and have a spring property.

Each of the pressing members 84 includes a main body 841, positioning holes 842, through-holes 843, and pressing parts 844.

The main body 841 is formed in a rectangular plate shape. A surface in the −Z direction in the main body 841 comes into contact with the surface 811A of the main body 811 of the frame 81.

Two positioning holes 842 are provided in the main body 841 to be separated in the +X direction. positioning parts 813 are inserted into the positioning holes 842 from the −Z direction. Specifically, the positioning parts 813U are inserted into the two positioning holes 842 included in the pressing member 84U and the positioning parts 813D are inserted into the two positioning holes 842 included in the pressing member 84D. Consequently, the pressing members 84U and 84D are positioned with respect to the frame 81.

Two through-holes 843 are provided in the main body 841 to be separated in the +X direction. The two through-holes 843 are provided in positions sandwiching the two positioning holes 842 in the +X direction. The fixing members FM2 are inserted into the through-holes 843 from the +Z direction. The fixing members FM2 inserted through the through-holes 843 of the pressing member 84U are fixed to the fixing parts 814U. Consequently, the pressing member 84U is fixed to the frame 81. The fixing members FM2 inserted through the through-holes 843 of the pressing member 84D are fixed to the fixing parts 814D. Consequently, the pressing member 84D is fixed to the frame 81.

Two pressing parts 844 are provided in each of the pressing members 84. The two pressing parts 844 project in the same direction from the end edge of the main body 841 when viewed from the +Z direction. Specifically, the pressing parts 844 in the pressing member 84U project in the −Y direction from the end edge in the −Y direction in the main body 841 and the pressing parts 844 in the pressing member 84D project in the +Y direction from the end edge in the +Y direction in the main body 841.

When the pressing member 84 is fixed to the frame 81, the pressing parts 844 come into contact with the contact surface 82A of the spacer 82 and press the spacer 82 and the substrate 63 toward the first heat radiating member 71.

Specifically, the pressing parts 844 of the pressing member 84U press the spacer element 83U toward the first heat radiating member 71 and press the substrate 63 of the light emitting part 61U toward the first heat radiating member 71. The pressing parts 844 of the pressing member 84D press the spacer element 83D toward the first heat radiating member 71 and press the substrate 63 of the light emitting part 61D toward the first heat radiating member 71.

Consequently, the substrate 63 and the first heat radiating member 71 come into surface contact at moderate pressure. The number of pressing parts 844 provided in the pressing member 84 can be changed as appropriate if the number is one or more.

Assembly of the Light Source Device

The light source device 5 explained above is assembled, for example, as explained below.

First, the cooling unit 7 is assembled. As shown in FIG. 7, a heat radiation surface 71B of the first heat radiating member 71 and the heat receiving surface 721A of the second heat radiating member 72 are thermally connected. At the same time, the first heat radiating member 71 and the base 73 are connected such that the heat receiving part 711 of the first heat radiating member 71 is disposed in the opening 731 of the base 73. Consequently, the cooling unit 7 is assembled.

Subsequently, the light source unit 6 is disposed in the cooling unit 7.

Specifically, the substrates 63 of the light emitting parts 61U and 61D configuring the light source unit 6 are disposed on the light receiving surface 711A of the first heat radiating member 71. At this time, heat conductive grease is disposed between the connection surfaces 63B of the substrates 63 and the heat receiving surface 711A. The substrates 63 are disposed such that all of the connection surfaces 63B are thermally connected to the heat receiving surface 711A.

Consequently, substantially the entire surfaces of the connection surfaces 63B of the substrates 63 can be used as a heat transmission surface to the heat receiving surface 711A. Heat can be efficiently transmitted from the light source unit 6 to the first heat radiating member 71.

Figure 10:
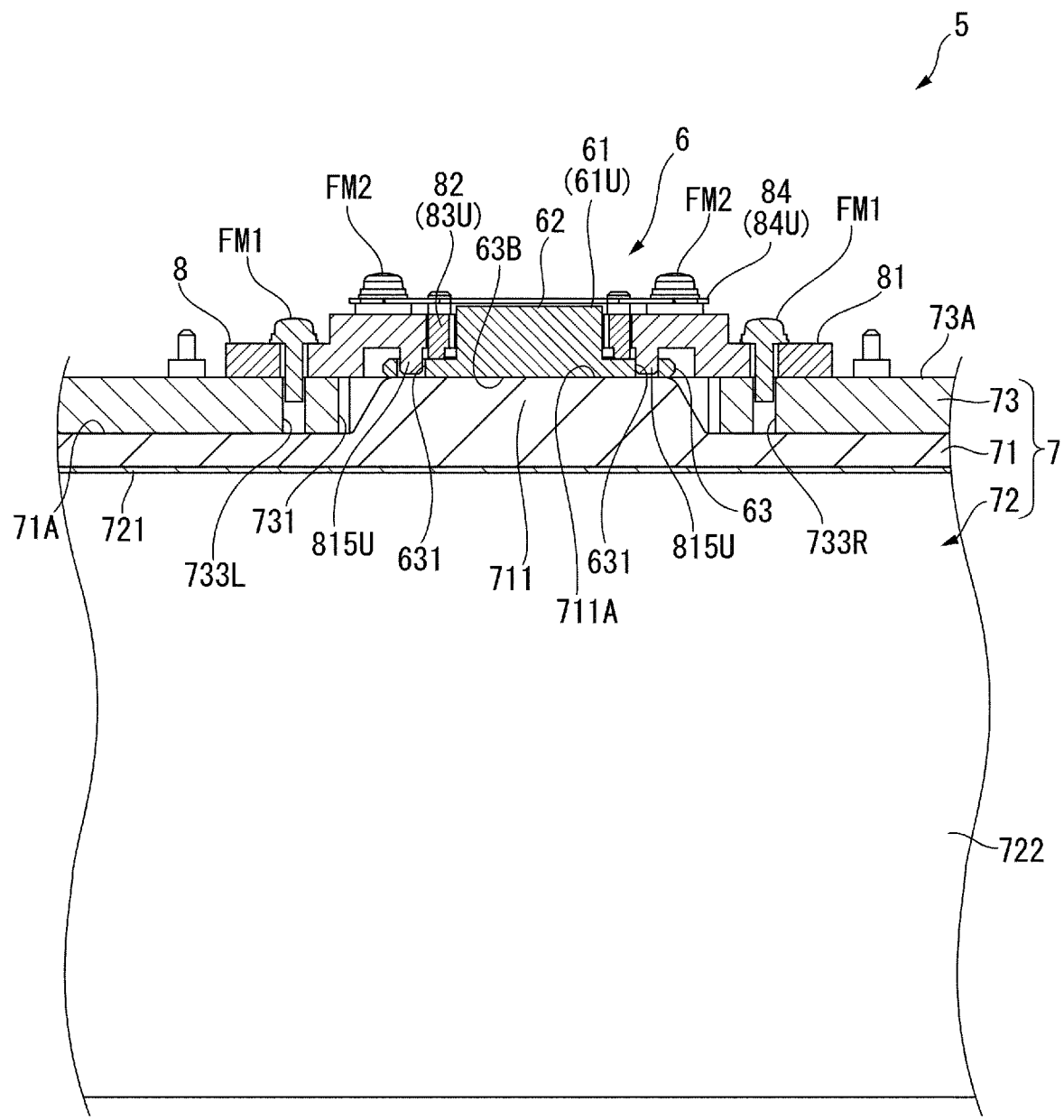
FIG. 10 is a sectional view showing the light source device in the first embodiment.

FIG. 10 is a diagram showing the cross section of the light source device 5 taken along an XZ plane. Specifically, FIG. 10 is a diagram showing the cross section of the light source device 5 in a X-X line in FIG. 3.

Thereafter, the light source unit 6 is fixed to the cooling unit 7 by the fixing unit 8.

First, the frame 81 is attached to the base 73. At this time, as shown in FIG. 10, the positioning part 815U of the frame 81 is inserted in the positioning hole 631 provided on the substrate 63 of the light emitting part 61U. The positioning part 815D of the frame 81 is inserted into the positioning hole 631 provided on the substrate 63 of the light emitting part 61D. Consequently, the substrates 63 are positioned with respect to the first heat radiating member 71.

The positioning part 732L of the base 73 is inserted into the positioning hole 817L of the frame 81 and the positioning part 732R of the base 73 is inserted into the positioning hole 817R of the frame 81. Consequently, the frame 81 is positioned with respect to the base 73.

The fixing members FM1 inserted through the holes 818L and 818R of the frame 81 are fixed to the fixing parts 733L and 733R of the base 73. Consequently, the frame 81 is fixed to the base 73.

Subsequently, the spacer 82 is disposed in the opening 812 of the frame 81. Consequently, the contact surface 82A of the spacer 82 comes into contact with the disposition surfaces 63A of the substrates 63.

As explained above, the external shape of the spacer 82 substantially coincides with the shape of the inner edge of the opening 812. Therefore, the spacer 82 is fit in the opening 812. The light emitting elements 62 are exposed via the openings 82U and 82D of the spacer 82.

Thereafter, the pressing member 84 is fixed to the frame 81 by the plurality of positioning parts 813 and the plurality of fixing parts 814U and 814D provided in the main body 811.

Specifically, the positioning part 813U is inserted into the positioning hole 842 of the pressing member 84U from the −Z direction to position the pressing member 84U in the frame 81. Similarly, the positioning part 813D is inserted into the positioning hole 842 of the pressing member 84D from the −Z direction to position the pressing member 84D in the frame 81. Consequently, the pressing parts 844 come into contact with the spacer 82.

The fixing members FM2 inserted through the through-holes 843 of the pressing member 84U are fixed to the fixing part 814U and the fixing members FM2 inserted through the through-holes 843 of the pressing member 84D are fixed to the fixing part 814D. Consequently, the pressing members 84U and 84D are fixed to the frame 81.

In this way, the pressing member 84U, which is the leaf spring, is fixed to the frame 81 to thereby press the substrate 63 of the heat emitting part 61U against the first heat radiating member 71 via the spacer element 83U of the spacer 82 with the pressing parts 844. Similarly, the pressing member 84D, which is the leaf spring, is fixed to the frame 81 to thereby press the substrate 63 of the light emitting part 61D against the first heat radiating member 71 via the spacer element 83D of the spacer 82 with the pressing parts 844.

Consequently, the entire connection surfaces 63B of the substrates 63 are thermally connected to the heat receiving surface 711A of the first heat radiating member 71 by surface contact. Therefore, the heat of the light emitting element 62 is efficiently transmitted to the first heat radiating member 71 via the substrate 63. Since the substrates 63 are connected to the heat receiving surface 711A at moderate pressure by the pressing member 84, it is possible to facilitate heat transmission from the substrates 63 to the first heat radiating member 71.

The pressing force of the substrate 63 with respect to the first heat radiating member 71 by the pressing member 84 can be adjusted by adjusting fastening of the pressing member 84 to the frame 81 by the fixing members FM2.

Effects of the First Embodiment

The projector 1 according to this embodiment explained above achieves the following effects.

The projector 1 includes the light source device 5, the light modulation device 343 that modulates light emitted from the light source device 5, and the projection optical device 36 that projects the light modulated by the light modulation device 343.

The light source device 5 includes the light emitting element 62 that emits light, the substrate 63 on which the light emitting element is disposed, the first heat radiating member 71, the base 73, the frame 81, and the pressing member 84. The first heat radiating member 71 is thermally connected to the substrate 63. The base 73 supports the first heat radiating member 71. The frame 81 is fixed to the base 73 and surrounds the light emitting element 62 and the substrate 63. The pressing member 84 is fixed to the frame 81 and presses the substrate 63 toward the first heat radiating member 71.

With such a configuration, in a state in which the substrate 63 on which the light emitting element 62 is provided is thermally connected to the first heat radiating member 71, the substrate 63 is pressed toward the first heat radiating member 71 by the pressing member 84 fixed to the frame 81 fixed to the base 73 supporting the first heat radiating member 71. Consequently, it is possible to bring the substrate 63 and the first heat radiating member 71 into surface contact. Besides, it is possible to thermally connect the substrate 63 and the first heat radiating member 71 at moderate pressure by the pressing member 84. Therefore, it is possible to efficiently transmit heat from the substrate 63 to the first heat radiating member 71 compared with when the substrate 63 is fixed to the base 73 or the first heat radiating member 71 by screws. Therefore, it is possible to efficiently cool the light emitting element 62 and the substrate 63 as well as the light source unit 6.

In the light source device 5, the pressing member 84 is the leaf spring formed of metal and having a spring property.

With such a configuration, it is possible to suppress deterioration of the pressing member 84. Besides, it is possible to radiate, with the pressing member 84, heat transmitted from the substrate 63. Since the pressing member 84 has the spring property, it is possible to press the substrate 63 against the first heat radiating member 71 with the pressing member 84 having a simple configuration.

In the light source device 5, the frame 81 blocks light made incident on the substrate 63.

With such a configuration, it is possible to suppress the substrate 63 from being deteriorated by light made incident on the substrate 63 from the outside. For example, it is possible to suppress deterioration of components such as a solder resist and an electrode provided on the substrate 63 and a cable connected to the disposition surface 63A of the substrate 63.

In the light source device 5, the frame 81 includes the positioning parts 815U and 815D that position the substrate 63.

With such a configuration, it is possible to position the substrate 63 in the first heat radiating member 71 by fixing the frame 81 to the base 73 supporting the first heat radiating member 71. Consequently, it is possible to reduce components that position the substrate 63 in the first heat radiating member 71. Therefore, it is possible to suppress accumulation of tolerance and accurately dispose the substrate 63 on the first heat radiating member 71.

The light source device 5 includes the spacer 82 disposed between the substrate 63 and the pressing member 84. The pressing member 84 presses the substrate 63 toward the first heat radiating member 71 via the spacer 82.

With such a configuration, since the spacer 82 comes into contact with the substrate 63, it is possible to increase a heat radiation area of heat transmitted from the substrate 63. Since the pressing member 84 presses the substrate 63 via the spacer 82, it is possible to increase an acting area of a pressing force by the pressing member 84 on the substrate 63 compared with when the pressing member 84 comes into direct contact with the substrate 63. Consequently, it is possible to cause the pressing force to substantially uniformly act on the substrate 63. Therefore, it is possible to substantially uniformly press substantially the entire surface of the connection surface 63B of the substrate 63 against the first heat radiating member 71 while suppressing deformation of the substrate 63 compared with when the substrate 63 is locally pressed by the pressing member 84. Since the pressing force against the substrate 63 is substantially uniform, it is possible to uniformize the thickness of the heat conductive grease between the substrate 63 and the first heat radiating member 71. Therefore, it is possible to efficiently transmit the heat of the substrate 63 to the first heat radiating member.

In the light source device 5, the spacer 82 blocks light made incident on the substrate 63.

With such a configuration, it is possible to suppress the substrate 63 from being deteriorated by light made incident on the substrate 63 from the outside. For example, it is possible to suppress deterioration of components such as a solder resist and an electrode provided on the substrate 63 and a cable connected to the substrate 63.

The light source device 5 includes the second heat radiating member 72 that is thermally connected to the first heat radiating member 71 and radiates heat transmitted from the first heat radiating member 71. The first heat radiating member 71 is a vapor chamber.

With such a configuration, since a heat radiation area of heat transmitted from the substrate 63 can be increased by the second heat radiating member 72, it is possible to efficiently radiate the heat of the light emitting element 62 and the substrate 63.

Since the first heat radiating member 71 is the vapor chamber, it is possible to efficiently transmit, to the second heat radiating member 72, the heat transmitted from the substrate 63. Therefore, it is possible to improve cooling efficiency of the light emitting element 62 and the substrate 63.

Second Embodiment

A second embodiment of the present disclosure is explained.

A projector according to this embodiment has the same configuration as the configuration of the projector 1 according to the first embodiment but is different in the configuration of a cooling unit. In the following explanation, the same or substantially the same portions as the portions explained above are denoted by the same reference numerals and signs and explanation of the portions is omitted.

Configuration of the Light Source Device

Figure 11:
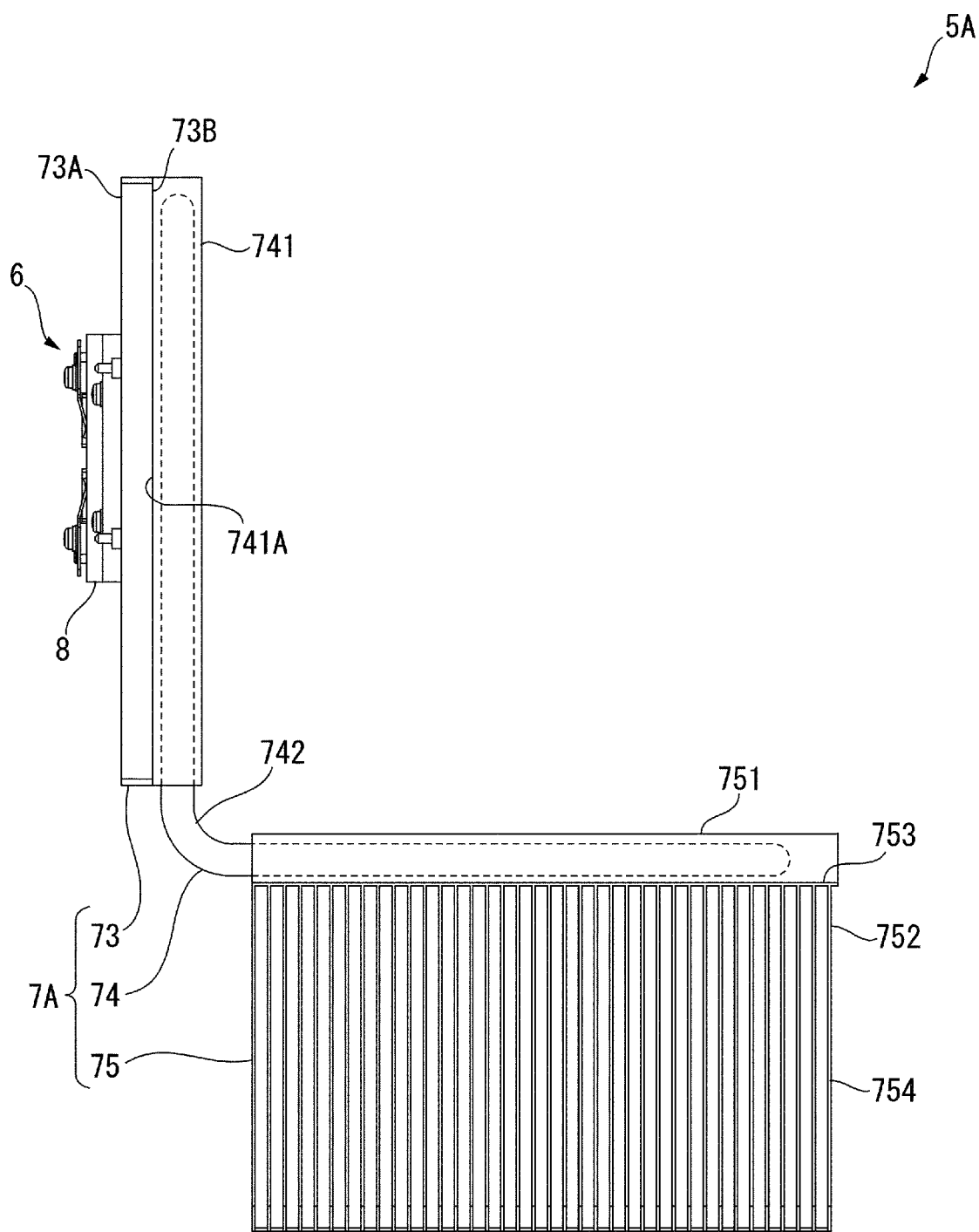
FIG. 11 is a side view showing a light source device included in a projector in a second embodiment.

FIG. 11 is a side view of a light source device 5A included in the projector according to this embodiment viewed from the +X direction.

The projector according to this embodiment has the same configuration and the same function as the configuration and the function of the projector 1 according to the first embodiment except that the projector includes the light source device 5A instead of the light source device 5 according to the first embodiment. The light source device 5A has the same configuration and the same function as the configuration and the function of the light source device 5 according to the first embodiment except that the light source device 5A includes a cooling unit 7A instead of the cooling unit 7 according to the first embodiment as shown in FIG. 11. That is, the light source device 5A according to this embodiment includes the light source unit 6, the cooling unit 7A, and the fixing unit 8.

Configuration of the Cooling Unit

Like the cooling unit 7, the cooling unit 7A radiates heat transmitted from the substrates 63 of the light emitting parts 61U and 61D and cools the light emitting element 62 and the substrates 63. The cooling unit 7A includes the base 73 according to the first embodiment, a first heat radiating member 74, and a second heat radiating member 75. In this embodiment, the base 73 supports the first heat radiating member 74.

Configuration of the First Heat Radiating Member

The first heat radiating member 74 is thermally connected to the substrate 63 and radiates, to the second heat radiating member 75, heat transmitted from the substrate 63. The first heat radiating member 74 includes a heat receiving member 741 and a heat pipe 742.

The heat receiving member 741 is a plate-like body made of metal. A surface 741A in the +Z direction of the heat receiving member 741 is connected to the surface 73B in the −Z direction in the base 73 and held by the base 73. Although not shown in FIG. 11, the heat receiving member 741 includes the same heat receiving part as the heat receiving part 711. That is, the heat receiving member 741 includes the heat receiving part disposed in the opening 731 of the base 73 to project in the +Z direction from the surface 741A. The heat receiving member 741 is thermally connected to the substrate 63 in the heat receiving part. A surface in the +Z direction in the heat receiving part is a heat receiving surface that comes into surface contact with the connection surfaces 63B of the substrates 63 and receives heat from the substrates 63. In this embodiment as well, heat conductive grease is disposed between the substrate 63 and the heat receiving surface.

The heat pipe 742 is a heat transmitting member that transmits, to the second heat radiating member 75, heat transmitted to the heat receiving member 741. A heat receiving end of the heat pipe 742 is connected to the heat receiving member 741. In this embodiment, the heat receiving end of the heat pipe 742 is inserted into the inside of the heat receiving member 741. The number of heat pipes 742 may be any number if the heat transmitted to the heat receiving member 741 can be efficiently transmitted to the second heat radiating member 75.

Configuration of the Second Heat Radiating Member

The second heat radiating member 75 is thermally connected to the first heat radiating member 74 and radiates heat transmitted from the first heat radiating member 74. The second heat radiating member 75 includes a heat receiving member 751 and a heat sink 752.

The heat receiving member 751 is a plate-like body made of metal. A heat radiation end of the heat pipe 742 is connected to the heat receiving member 751. In this embodiment, the heat radiation end of the heat pipe 742 is inserted into the inside of the heat receiving member 751. Consequently, heat is transmitted to the heat receiving member 751 via the heat pipe 742.

The heat sink 752 is attached to the heat receiving member 751 and radiates heat transmitted from the heat receiving member 751. The heat sink 752 has the same configuration as the configuration of the second heat radiating member 72 according to the first embodiment. That is, the heat sink 752 includes a heat receiving part 753 and a plurality of fins 754.

The heat receiving part 753 is thermally connected to the heat receiving member 751.

Each of the plurality of fins 754 extends from the heat receiving part 753 in the opposite direction of the heat receiving member 751. The plurality of fins 754 transmit, to a cooling gas circulated by a not-shown fan, heat transmitted from the heat receiving member 751 to thereby radiate the heat of the light emitting element 62 and the substrate 63.

Effects of the Second Embodiment

The projector according to this embodiment explained above achieves the following effects besides achieving the same effects as the effects of the projector 1 according to the first embodiment.

The light source device 5A includes, besides the first heat radiating member 74, the second heat radiating member 75 that is thermally connected to the first heat radiating member 74 and radiates heat transmitted from the first radiating member 74. The first heat radiating member 74 includes the heat receiving member 741 thermally connected to the substrate 63 and the heat pipe 742 that transmits, to the second heat radiating member 75, heat transmitted to the heat receiving member 741.

With such a configuration, since a heat radiation area of heat transmitted from the substrate 63 can be increased by the second heat radiating member 75, it is possible to efficiently radiate the heat of the light emitting element 62 and the substrate 63.

Since the first heat radiating member 74 includes the heat receiving member 741 and the heat pipe 742, it is possible to efficiently transmit, to the second heat radiating member 75, heat transmitted from the substrate 63. Therefore, it is possible to improve cooling efficiency of the light emitting element 62 and the substrate 63. Besides, since the second heat radiating member 75 can be disposed in a position apart from the heat receiving member 741 by the heat pipe 742, it is possible to improve a degree of layout freedom of the second heat radiating member 75.

MODIFICATIONS OF THE EMBODIMENTS

The present disclosure is not limited to the embodiments. Modifications, improvements, and the like in a range in which the object of the present disclosure can be achieved are included in the present disclosure.

In the embodiments, the light source devices 5 and 5A include the two pressing members 84. However, not only this, but the number of pressing members included in the light source device in the present disclosure may be one or may be three or more. The light source devices 5 and 5A include the spacer 82 configured by combining the two spacer elements 83. However, not only this, but the spacer 82 may be configured by one component or may be configured by combining three of more spacer elements 83.

In the embodiments, the light source devices 5 and 5A include the light source unit 6. The light source unit 6 includes the two light emitting parts 61U and 61D. However, not only this, but the number of light emitting parts included in the light source device of the present disclosure may be one or may be three or more. That is, the number of substrates included in the light source device of the present disclosure only has to be one or more. The number of light emitting elements provided on the substrate also only has to be equal to or larger than one.

In the embodiments, the pressing member 84 is the leaf spring formed of metal and having the spring property. However, not only this, but the pressing member 84 may be formed of a material other than metal. The pressing member 84 does not have to have the spring property and may be fixed to the frame 81 in a state in which the substrate 63 is pressed against the first heat radiating member 71. The pressing member 84 may not be the leaf spring. For example, the pressing member of the present disclosure may be an urging member such as a coil spring that is provided between a locking part provided in the frame 81 and the substrate 63 or the spacer 82 and presses the substrate 63 toward the first heat radiating member 71.

In the embodiments, the frame 81 fixed to the base 73 includes the positioning parts 815U and 815D that position the substrates 63 on the heat receiving surface 711A of the first heat radiating member 71. However, not only this, but the frame 81 may not position the substrate 63. On the other hand, the frame may include a positioning part that positions the spacer. The spacer may include a positioning part that positions the substrate.

In the embodiments, the pressing member 84 presses the substrate 63 toward the first heat radiating member 71 via the spacer 82. That is, the light source devices 5 and 5A include the spacer 82 disposed between the substrate 63 and the pressing parts 844 of the pressing member 84. However, not only this, but the spacer 82 may be absent. That is, a pressing part of a pressing member fixed to the frame 81 may further extend in the −Z direction than the pressing parts 844 in the embodiments, directly come into contact with the substrate 63, and press the substrate 63 toward the first heat radiating member 71.

In the embodiments, the spacer 82 has the light blocking property for blocking light made incident on the substrate 63 from the outside. However, not only this, but the spacer 82 may not have the light blocking property. The spacer 82 is formed of metal and has the heat radiation property for radiating heat transmitted from the substrate 63. However, not only this, but the spacer 82 may be formed of a material other than metal.

In the first embodiment, the first heat radiating member 71 is the vapor chamber. In the second embodiment, the first heat radiating member 74 includes the heat receiving member 741 and the heat pipe 742. However, the configuration of the first heat radiating member of the present disclosure is not limited to the above explanation. For example, the first heat radiating member may be obtained by connecting the second heat radiating member 72 to the heat receiving member 741.

In the embodiments, the wavelength conversion layer 442 and the reflection layer 443 of the wavelength conversion element 44 are fixed to the housing 48 and supported by the substrate 441 projecting to the outer side from the wall surface of the housing 48. However, not only this, but the wavelength conversion layer 442 and the reflection layer 443 may be supported by the wall surface of the housing 48. In this case, the lenses 431 and 432 of the first condensing element 43 are fixed to the housing 48 by, for example, a supporting member extending from the wall surface in the −Y direction or the wall surface in the +Y direction of the housing 48. Further, the wavelength conversion layer 442 and the reflection layer 443 may be structured to be supported with respect to the housing 48 by the supporting member while being spaced apart from the wall surface of the housing 48.

In the embodiments, the diffusion and reflection layer 462 of the diffusing and reflecting element 46 is supported by the substrate 461 fixed to the housing 48 and projecting to the outer side from the wall surface of the housing 48. However, not only this, but, like the wavelength conversion layer 442 and the reflection layer 443, the diffusion and reflection layer 462 may be supported by the wall surface of the housing 48 or may be supported with respect to the housing 48 by a supporting member extending from the wall surface of the housing 48 while being spaced apart from the wall surface of the housing 48.

In the embodiments, the projector includes the three light modulation devices 343B, 343G, and 343R. However, not only this, but the present disclosure is also applicable to a projector including two or less or four or more light modulation devices.

In the embodiments, the light modulation device 343 is the transmissive liquid crystal panel, the light incidence surface and the light emission surface of which are different. However, not only this, but a reflective liquid crystal panel, a light incidence surface and a light emission surface of which are the same, may be used as a light modulation device. A light modulation device other than liquid crystal such as a light modulation device that makes use of a device including a micromirror, for example, a DMD (Digital Micromirror Device) may be used if the light modulation device is capable of modulating an incident light beam and forming an image corresponding to image information.

In the embodiments, the projector is illustrated as the configuration including the light source device according to the present disclosure. However, not only this, but the light source device can be used alone. Besides, the light source device according to the present disclosure may be applied to electronic equipment and a device other than the projector.

OVERVIEW OF THE PRESENT DISCLOSURE

An overview of the present disclosure is added below.

A light source device according to a first aspect of the present disclosure includes: a light emitting element configured to emit light; a substrate on which the light emitting element is disposed; a first heat radiating member thermally connected to the substrate; a base supporting the first heat radiating member; a frame fixed to the base and surrounding the light emitting element and the substrate; and a pressing member fixed to the frame and configured to press the substrate toward the first heat radiating member.

With such a configuration, in a state in which the substrate on which the light emitting element is provided is thermally connected to the first heat radiating member, the substrate is pressed toward the first heat radiating member by the pressing member fixed to the frame fixed to the base supporting the first heat radiating member. Consequently, it is possible to bring the substrate and the first heat radiating member into surface contact. Besides, it is possible to thermally connect the substrate and the first heat radiating member at moderate pressure by the pressing member. Accordingly, it is possible to efficiently transmit heat from the substrate to the first heat radiating member compared with when the substrate is fixed to the base or the first heat radiating member by screws. Therefore, it is possible to efficiently cool the light emitting element and the base.

In the first aspect, the pressing member may be formed of metal and have a spring property.

With such a configuration, it is possible to suppress deterioration of the pressing member. Besides, it is possible to radiate, with the pressing member, heat transmitted from the substrate. Since the pressing member has the spring property, it is possible to press the substrate against the first heat radiating member with the pressing member having a simple configuration.

In the first aspect, the frame may block light made incident on the substrate.

With such a configuration, it is possible to suppress the substrate from being deteriorated by light made incident on the substrate from the outside. For example, it is possible to suppress deterioration of components such as a solder resist and an electrode provided on the substrate and a cable connected to the substrate.

In the first aspect, the frame may include a positioning part configured to position the substrate.

With such a configuration, it is possible to position the substrate in the first heat radiating member by fixing the frame to the base supporting the first heat radiating member. Consequently, it is possible to reduce components that position the substrate in the first heat radiating member. Therefore, it is possible to suppress accumulation of tolerance and accurately dispose the substrate on the first heat radiating member.

In the first aspect, the light source device may further include a spacer disposed between the substrate and the pressing member, and the pressing member may press the substrate toward the first heat radiating member via the spacer.

With such a configuration, since the spacer comes into contact with the substrate, it is possible to increase a heat radiation area of heat transmitted from the substrate. Since the pressing member presses the substrate via the spacer, it is possible to increase an acting area of a pressing force by the pressing member in the substrate compared with when the pressing member directly comes into contact with the substrate. Consequently, since it is possible to cause the pressing force to substantially uniformly act on the substrate, it is possible to substantially uniformly press the substrate against the first heat radiating member while suppressing deformation of the substrate compared with when the substrate is locally pressed by the pressing member. Therefore, it is possible to efficiently transmit the heat of the substrate to the first heat radiating member.

In the first aspect, the spacer may block light made incident on the substrate.

With such a configuration, it is possible to suppress the substrate from being deteriorated by light made incident on the substrate from the outside. For example, it is possible to suppress deterioration of components such as a solder resist and an electrode provided on the substrate and a cable connected to the substrate.

In the first aspect, the light source device may further include a second heat radiating member thermally connected to the first heat radiating member and configured to radiate heat transmitted from the first heat radiating member, and the first heat radiating member may be a vapor chamber.

With such a configuration, a heat radiation area of heat transmitted from the substrate can be increased by the second heat radiating member. Therefore, it is possible to efficiently radiate the heat of the light emitting element and the substrate.

Since the first heat radiating member is the vapor chamber, it is possible to efficiently transmit, to the second heat radiating member, the heat transmitted from the substrate. Therefore, it is possible to improve cooling efficiency of the light emitting element and the substrate.

In the first aspect, the light source device may further include a second heat radiating member thermally connected to the first heat radiating member and configured to radiate heat transmitted from the first heat radiating member, and the first heat radiating member may include: a heat receiving member thermally connected to the substrate; and a heat pipe for transmitting, to the second heat radiating member, heat transmitted to the heat receiving member.

With such a configuration, a heat radiation area of heat transmitted from the substrate can be increased by the second heat radiating member. Therefore, it is possible to efficiently radiate the heat of the light emitting element and the substrate.

Since the first heat radiating member includes the heat receiving member and the heat pipe, it is possible to efficiently transmit, to the second heat radiating member, the heat transmitted from the substrate. Therefore, it is possible to improve cooling efficiency of the light emitting element and the substrate. Besides, the second heat radiating member can be disposed in a position apart from the heat receiving member by the heat pipe. Therefore, it is possible to improve a degree of layout freedom of the second heat radiating member.

A projector according to a second aspect of the present disclosure includes: the light source device according to the first aspect; a light modulation device configured to modulate light emitted from the light source device; and a projection optical device configured to project the light modulated by the light modulation device.

With such a configuration, it is possible to achieve the same effects as the effects of the light source device according to the first aspect.

What is claimed is:

1. A light source device comprising:
a light emitting element configured to emit light;
a substrate as a pressed object on which the light emitting element is disposed;
a first heat radiating member thermally connected to the substrate;
a base supporting the first heat radiating member, the base having an interior opening therein, the substrate being in direct contact with the first heat radiating member via the opening;
a frame fixed to the base, surrounding the light emitting element and the substrate and configured to press the substrate; and
a pressing member provided with the frame and configured to press the substrate toward the first heat radiating member,
wherein the pressing member is a leaf spring having a main body fixed to the frame and a pressing part configured to press the substrate.

2. The light source device according to claim 1, wherein the pressing member is formed of metal.

3. The light source device according to claim 1, wherein the frame blocks light made incident on the substrate.

4. The light source device according to claim 1, wherein the frame includes a positioning part configured to position the substrate.

5. A projector comprising:
the light source device according to claim 1;
a light modulator configured to modulate light emitted from the light source device; and
a projection optical device configured to project the light modulated by the light modulation device.

6. A light source device comprising:
a light emitting element configured to emit light;
a substrate as a pressed object on which the light emitting element is disposed;
a first heat radiating member thermally connected to the substrate;
a base supporting the first heat radiating member;
a frame fixed to the base, and surrounding the light emitting element and the substrate and configured to press the substrate;
a pressing member provided with the frame and configured to press the substrate toward the first heat radiating member; and
a spacer disposed between the substrate and the pressing member, wherein
the pressing member presses the substrate toward the first heat radiating member via the spacer.

7. The light source device according to claim 6, wherein the spacer blocks light made incident on the substrate.

8. A projector comprising:
the light source device according to claim 6;
a light modulator configured to modulate light emitted from the light source device; and
a projection optical device configured to project the light modulated by the light modulation device.

9. A light source device comprising:
a light emitting element configured to emit light;
a substrate as a pressed object on which the light emitting element is disposed;
a first heat radiating member thermally connected to the substrate;
a base supporting the first heat radiating member;
a frame fixed to the base, and surrounding the light emitting element and the substrate and configured to press the substrate;
a pressing member provided with the frame and configured to press the substrate toward the first heat radiating member; and
a second heat radiating member thermally connected to the first heat radiating member and configured to radiate heat transmitted from the first heat radiating member, wherein
the first heat radiating member is a vapor chamber.

10. A projector comprising:
the light source device according to claim 9;
a light modulator configured to modulate light emitted from the light source device; and
a projection optical device configured to project the light modulated by the light modulation device.

11. A light source device comprising:
a light emitting element configured to emit light;
a substrate as a pressed object on which the light emitting element is disposed;
a first heat radiating member thermally connected to the substrate;
a base supporting the first heat radiating member;
a frame fixed to the base, and surrounding the light emitting element and the substrate and configured to press the substrate;
a pressing member provided with the frame and configured to press the substrate toward the first heat radiating member; and
a second heat radiating member thermally connected to the first heat radiating member and configured to radiate heat transmitted from the first heat radiating member, wherein
the first heat radiating member includes a heat receiving member thermally connected to the substrate and a heat pipe configured to transmit, to the second heat radiating member, heat transmitted to the heat receiving member.

12. A projector comprising:
the light source device according to claim 11;
a light modulator configured to modulate light emitted from the light source device; and
a projection optical device configured to project the light modulated by the light modulation device.

* * * * *